(12) United States Patent
Tennakoon

(10) Patent No.: US 12,197,636 B2
(45) Date of Patent: Jan. 14, 2025

(54) COST PER SCENT SYSTEM AND METHOD

(71) Applicant: Koshayojan Services Limited, Port Louis (MU)

(72) Inventor: Chamli Tennakoon, Corona, CA (US)

(73) Assignee: Koshayojan Services Limited, Port Louis (MU)

( * ) Notice: Subject to any disclaimer, the term of this patent is extended or adjusted under 35 U.S.C. 154(b) by 0 days.

(21) Appl. No.: 18/601,758

(22) Filed: Mar. 11, 2024

(65) Prior Publication Data

US 2024/0211030 A1    Jun. 27, 2024

Related U.S. Application Data

(63) Continuation-in-part of application No. 17/991,725, filed on Nov. 21, 2022, now Pat. No. 12,058,425, which is a continuation-in-part of application No. 16/789,362, filed on Feb. 12, 2020, now Pat. No. 11,194,387, which is a continuation-in-part of application No. 16/352,595, filed on Mar. 13, 2019, now Pat. No. 10,743,087, which is a continuation of application No. 15/976,599, filed on May 10, 2018, now Pat. No. 11,009,940, which is a continuation of application No. 15/976,590, filed on May 10, 2018, now Pat. No. 10,990,163, which is a continuation of application No. 15/629,621, filed on Jun. 21, 2017, now Pat. No. 10,101,804.

(51) Int. Cl.

| | |
|---|---|
| *A63J 25/00* | (2009.01) |
| *G06F 3/01* | (2006.01) |
| *G06F 3/16* | (2006.01) |
| *G06F 8/38* | (2018.01) |
| *A63J 5/00* | (2006.01) |

(52) U.S. Cl.
CPC ............. *G06F 3/011* (2013.01); *G06F 3/016* (2013.01); *G06F 3/16* (2013.01); *G06F 3/167* (2013.01); *G06F 8/38* (2013.01); *A63J 2005/001* (2013.01); *A63J 25/00* (2013.01)

(58) Field of Classification Search
CPC . G06F 3/011; G06F 3/016; G06F 3/16; G06F 3/167; G06F 8/38; A63J 25/00; A63J 2005/001
See application file for complete search history.

(56) References Cited

U.S. PATENT DOCUMENTS

| | | |
|---|---|---|
| 3,628,829 A | 12/1971 | Heilig |
| 8,447,824 B2 | 5/2013 | Hong et al. |

(Continued)

FOREIGN PATENT DOCUMENTS

| | | |
|---|---|---|
| CN | 103761667 A | 4/2014 |
| CN | 104881123 A | 9/2015 |

(Continued)

OTHER PUBLICATIONS

Natural Machines, retrieved from the web at https://www.naturalrnachines.com/dated May 10, 2018 (4 pgs.).

(Continued)

*Primary Examiner* — Beau D Spratt
(74) *Attorney, Agent, or Firm* — Manatt, Phelps & Phillip

(57) ABSTRACT

An interactive content monetization system and method allows the various sense hotspots in the interactive content to be monetized by the interactive system and the content provider.

15 Claims, 24 Drawing Sheets

(56) References Cited

U.S. PATENT DOCUMENTS

| | | | |
|---|---|---|---|
| 8,490,132 B1 | 7/2013 | Shi et al. | |
| 9,781,490 B2 * | 10/2017 | Makhlouf | H04N 21/8549 |
| 9,824,573 B1 | 11/2017 | Beres et al. | |
| 10,101,804 B1 | 10/2018 | Tennakoon et al. | |
| 10,380,804 B1 | 8/2019 | Pintaric | |
| 10,596,460 B2 | 3/2020 | Travis et al. | |
| 10,743,087 B2 | 8/2020 | Tennakoon et al. | |
| 10,990,163 B2 | 4/2021 | Tennakoon et al. | |
| 11,009,940 B2 | 5/2021 | Tennakoon et al. | |
| 11,192,022 B2 | 12/2021 | Travis et al. | |
| 11,194,387 B1 | 12/2021 | Tennakoon | |
| 11,509,974 B2 | 11/2022 | Tennakoon et al. | |
| 2004/0015983 A1 * | 1/2004 | Lemmons | H04N 21/44218 |
| | | | 348/E7.063 |
| 2006/0017654 A1 | 1/2006 | Romo | |
| 2006/0084050 A1 | 4/2006 | Haluck | |
| 2007/0126927 A1 * | 6/2007 | Yun | A63J 5/00 |
| | | | 348/473 |
| 2008/0034295 A1 | 2/2008 | Kulas | |
| 2008/0117202 A1 | 5/2008 | Martinez et al. | |
| 2008/0255636 A1 | 10/2008 | Delmain et al. | |
| 2009/0094520 A1 | 4/2009 | Kulas et al. | |
| 2009/0096632 A1 | 4/2009 | Ullrich | |
| 2009/0171902 A1 | 7/2009 | MacLaurin et al. | |
| 2009/0209211 A1 | 8/2009 | Kondo | |
| 2010/0077261 A1 | 3/2010 | Jung et al. | |
| 2010/0179950 A1 | 7/2010 | Willcock | |
| 2010/0195974 A1 * | 8/2010 | Zheng | H04N 21/6581 |
| | | | 386/343 |
| 2010/0251169 A1 | 9/2010 | Kimchi | |
| 2010/0274774 A1 | 10/2010 | Son | |
| 2010/0277469 A1 | 11/2010 | Borrel et al. | |
| 2011/0251902 A1 * | 10/2011 | Nagarajayya | G06Q 30/02 |
| | | | 705/14.71 |
| 2011/0296318 A1 | 12/2011 | Takayama et al. | |
| 2011/0319180 A1 | 12/2011 | Lee | |
| 2012/0281138 A1 | 11/2012 | Choi et al. | |
| 2013/0002405 A1 | 1/2013 | Pesonen et al. | |
| 2013/0194437 A1 | 8/2013 | Osman | |
| 2013/0226704 A1 | 8/2013 | Fernandez | |
| 2013/0339433 A1 | 12/2013 | Li et al. | |
| 2014/0095150 A1 | 4/2014 | Berjikly | |
| 2014/0248033 A1 | 9/2014 | Hung | |
| 2014/0267903 A1 | 9/2014 | Gains | |
| 2014/0324222 A1 | 10/2014 | Chee et al. | |
| 2015/0241708 A1 | 8/2015 | Watanabe | |
| 2015/0297109 A1 | 10/2015 | Garten | |
| 2016/0157612 A1 | 6/2016 | Lim | |
| 2016/0248815 A1 | 8/2016 | Ho | |
| 2016/0371721 A1 | 12/2016 | Bogdon | |
| 2017/0011210 A1 | 1/2017 | Cheong | |
| 2017/0013309 A1 | 1/2017 | Jallouli | |
| 2017/0090418 A1 | 3/2017 | Tsang | |
| 2017/0169128 A1 | 6/2017 | Batchu et al. | |
| 2017/0214962 A1 | 7/2017 | Ono | |
| 2017/0290430 A1 | 10/2017 | Park | |
| 2017/0323348 A1 | 11/2017 | Kenyon | |
| 2018/0033263 A1 | 2/2018 | Novich et al. | |
| 2018/0035019 A1 | 2/2018 | Back | |
| 2018/0254959 A1 | 9/2018 | Mantyjarvi | |
| 2018/0286351 A1 * | 10/2018 | Fateh | A61K 9/007 |
| 2018/0314959 A1 | 11/2018 | Apokatanidis | |
| 2018/0373321 A1 | 12/2018 | Tennakoon | |
| 2018/0373322 A1 | 12/2018 | Tennakoon et al. | |
| 2019/0215582 A1 | 7/2019 | Tennakoon et al. | |
| 2020/0374603 A1 | 11/2020 | Tennakoon et al. | |
| 2024/0144651 A1 | 5/2024 | Bulat | |
| 2024/0144655 A1 | 5/2024 | De | |

FOREIGN PATENT DOCUMENTS

| | | |
|---|---|---|
| JP | 2003324402 A | 11/2003 |
| JP | 2009194597 A | 8/2009 |
| JP | 2010510606 A | 4/2010 |
| JP | 2016201678 A | 12/2016 |
| KR | 20090038835 A | 4/2009 |
| KR | 20110111204 A | 10/2011 |
| KR | 20110139614 A | 12/2011 |
| WO | WO2001/096996 A1 | 12/2001 |
| WO | WO2005048541 A1 | 5/2005 |
| WO | WO2006/013363 A1 | 2/2006 |
| WO | WO2015198716 A1 | 12/2015 |

OTHER PUBLICATIONS

Ultrahaptics home webpage, retrieved from the web at https://www.ultrahaptics.com/, dated May 10, 2018 (2 pgs.).

ONOTES home webpage, retrieved from the web at https://onotes.com/ dated May 10, 2018 (7 pgs.).

Samsung home webpage, retrieved from the web at https://www.samsung.com/us/mobile/virtual-reality/gear-vr/gear-vr-sm-r322nzwaxar/ dated May 10, 2018 (19 pgs.).

Oculus Rift home webpage, retrieved from the web at https:/www.oculus.com/rift/#oui-esl-rift-games=mages-tale, dated May 10, 2018 (18 pgs.).

Srivastava, Tavish; entitled Introduction to K-Nearest Neighbors: Simplified (with implementation in Python) dated Mar. 27, 2018, retrieved from the web at https://www.analyticsvidhya.com /blog/2018/03/introduction-k-neighbors-algorithm-clustering (29 pgs.).

Boyle, E., Gamer in Chief entitled "Cyrano is the digital scent speaker designed to improve your mood" dated Apr. 28, 2016 (3 pages).

Marxent Labs, LLC; Visual Commerce 30 Virtual Reality Design Studio entitled "Visual Commerce—The Virtual Products Platform" dated 2016 (11 pages).

Jalal et al.; "Enhancing TV Broadcasting Services: A Survey on Multimedia Quality of Experience", IEEE International Symposium on Broadband Multimedia Systems and Broadcasting (BMSB, Jun. 7, 2017 (Jun. 7, 2017), pp. 1-7, XP055555488.

Wikipedia entitled, "List of Emotions" dated May 10, 2018 retrieved from the web at https://simple.wikipedia.org/wiki/List_of_emotions#/media/File:Plutchik-wheel.svg, (3 pgs.).

* cited by examiner

901: Hot Spotting Screen

902: Hot Spot Mapping of Video

900

Request
https://xxxxx/timelines/<video_id>

FIGURE 20A

Response
{
 "Smell":{
  "1532021964809":{
   "code": 1,
   "current_time": 20,
   "duration": 5,
   "element_title": "Peppermint",
   "elementname": "Smell",
   "family": "Flower Family",
   "now": 1532021964809,
   "thumbnail": "/images/smell/peppermint.png"
  },
  "1532021982879":{
   "code": 4,
   "current_time": 38,
   "duration": 10,
   "element_title": "Jasmine",
   "elementname": "Smell",
   "family": "Flower Family",
   "now": 1532021982879,
   "thumbnail": "/images/smell/jasmine.png"
  },
  "1532022003520":{
   "code": 7,
   "current_time": 87,
   "duration": 10,
   "element_title": "Sandalwood",
   "elementname": "Smell",
   "family": "Flower Family",
   "now": 1532022003520,
   "thumbnail": "/images/smell/sandalwood.png"
  }
 }
}

FIGURE 20B

COST PER SCENT SYSTEM AND METHOD

RELATED APPLICATIONS

This application is a continuation in part of and claims priority under 35 USC 120 to U.S. patent application Ser. No. 17/991,725, filed Nov. 21, 2022 that in turn is a continuation in part of U.S. application Ser. No. 16/789,362, filed Feb. 12, 2020 (now U.S. Pat. No. 11,194,387 issued Dec. 7, 2021) that is a continuation in part of and claims priority under 35 USC 120 to U.S. patent application Ser. No. 16/352,595 filed Mar. 13, 2019 (now U.S. Pat. No. 10,743,087 issued on Aug. 11, 2020) that is a continuation and claims priority under 35 USC 120 to U.S. patent application Ser. No. 15/976,599 filed May 10, 2018 (now U.S. Pat. No. 11,009,940 issued May 18, 2021) that is a continuation and claims priority under 35 USC 120 to U.S. patent application Ser. No. 15/976,590 filed May 10, 2018 (now U.S. Pat. No. 10,990,163 issued Apr. 27, 2021) that is a continuation and claims priority under 35 USC 120 to U.S. patent application Ser. No. 15/629,621 filed on Jun. 21, 2017 (now U.S. Pat. No. 10,101,804 issued on Oct. 16, 2018), the entirety of all of which is incorporated herein by reference.

FIELD

The disclosure relates to a system and method for interacting with digital content using one or more of five senses including sight, touch, taste, smell and sound.

BACKGROUND

It is well known that typical Internet search engines, such as Google, etc., monetize the search results. A Traditional Search Engine Revenue model is one in which the search engine displays many results in response to a user's search query and the top few results are always sponsored results. When the User engages with the Sponsored results links, the advertisers pay a fee to the Search engine in response to the User's engagement.

A human being has six different senses by which the human being can sense an environment including touch sensed by various parts the human body and mind. Those six senses include: 1. Eyes—for consuming all what you capture through this sense organ. 2Ears—What we hear. 3. Nose—What we smell. 4. Mouth—what we eat and taste and 5.sup.th our Skin—Through the touch we feel; and the $6^{th}$ Sense Organ, which is the Mind.

Existing content systems, such as typical television, movies, etc., typically allow a user to experience the content through the sight and sound senses. Other systems may allow the user to experience the content by the smell sense or the taste sense. Furthermore, there are existing systems that allow user to experience the content via the touch sense such as a haptic feedback system. None of the known content systems integrate all five senses into a device to provide a unified 5 senses content experience. Furthermore, the known content systems that integrate all five senses also provide a mechanism/model to monetize the content integrated with the five senses. Thus, a technology problem of the existing systems is that none of those systems provide integrated five sense content interaction with an ability to monetize the content. While systems exist that individually allow a user to interact with content using the five different senses and there are search engine systems that monetize the search results, but no one to date has actually integrated all of those systems together and provide a monetization mechanism which is not trivial since each of the existing systems do not necessarily communicate with each other.

BRIEF DESCRIPTION OF THE DRAWINGS

FIGS. 20A and 20B illustrate an example of a hotspot metadata request and response, respectively.

DETAILED DESCRIPTION OF ONE OR MORE EMBODIMENTS

Figure 1:
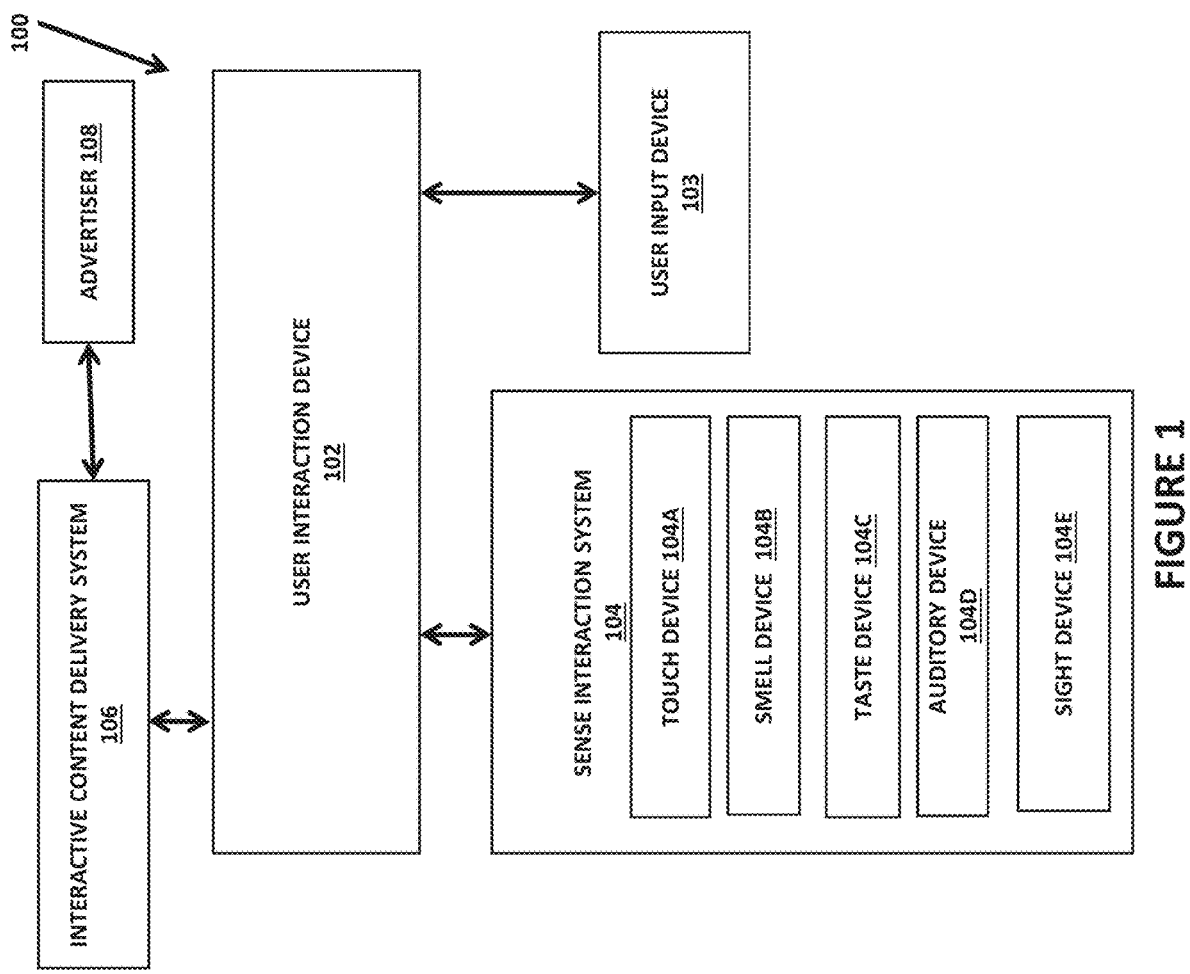
FIG. 1 illustrates a content interaction system and method.

The disclosure is particularly applicable to a five sense content interaction system for media content, that may include television content, that has a monetization component and it is in this context that the disclosure will be described. It will be appreciated, however, that the system and method has greater utility since it may be used with other content that can be made interactive. The disclosed system and method may be implemented as a virtual software only system without any hardware solely communicating with third party hardware devices. In one embodiment, the system and method may cater to the first five senses: eyes, ears, nose, mouth and skin. In another embodiment, the system and method may cater to all of the six senses since the mind is more complicated that the other senses. Furthermore, the system may be implemented in various different pieces of smart furniture in addition to the example shown in FIGS. 2B and 2C. For example, the smart furniture may include the couch or seat or seat and coffee table shown in the figures, but may also include any other device or system from which a user may interact with the interactive content, such as a hot tub, an entertainment center and the like. In addition, the content interaction system portions may be attached to and/or connectable releasable from a piece of furniture so that the content interaction system may be moved between different pieces of furniture. Similar to the sense interaction, the user may also engage with a particular one or more sense hotspots when in or adjacent to the furniture that has the sense interaction system (or elements) embedded/attached to the furniture.

The disclosed content interaction system and method provides a five senses experience through all types of Content—both in-house and third party content and the next step in this domain is to invent a technology that enables monetization of the 5 senses content interaction system and method. Thus, in the context of 5 Senses Content Interaction system and method, users engagement with the any of the enhanced 5 senses Experience can be monetized. In one embodiment, each content creator for each interactive piece of content can create and embed 'hotspots' that provides any one of the 5 senses, enhanced experience in terms of the traditional video and audio delivery that may include AR, VR for Sight, 3D audio for Sound, haptic and tactile feedback for Touch, Olfactory feedback for Smell and 3D Printed food or Food Ordering for Taste. The user is provided a choice to engage with any of these 5 Senses voluntarily, by clicking on the Hotspot appearing on the Content for a defined period of time (a few seconds in one embodiment). The user can also involuntarily interact with a Hotspot that may be monetizable using the cost per scent system.

In one embodiment, each content creator is allowed to place one or more of the five Senses (5S) 'hotspots' anywhere on the frame and multiple hotspots in the same frame as well. When there are multiple hotspots placed in a single frame, the User interacts with 'hotspots' that they want to experience and has the option to ignore the rest.

The User can look for details of certain hotspots particularly to decide to engage with the hotspot and the others will have an element of surprise to provide the immersive experience to the user. For Example, when the Hotspot pertaining to the Sense of Taste, appears, the User will be able to engage with the Hotspot to check the details of the sense indicated in the Hotspot by clicking on the 'Sense Details' page and the following information may be listed and displayed to the User such as: Ingredients that could go into the Food Printer Cartridges to make the desired dish Ingredients that could be substituted Design catalogue to choose the print design from List of restaurants where similar category of food could be ordered from Connect with a restaurant aggregator APIs to connect those category restaurants in order to order food from the restaurant.

The User is said to have engaged with these senses, where more details are provided when, in this example, the Food is printed through the 5 Senses Content Interaction System or when the food is ordered and payment completed, and not disregarding an option for completing certain steps in the engagement process with the Hotspot on the content as described in more detail below. When the User engages with the hotspot voluntarily, the Content engagement is said to be more quantified which provides an opportunity for the Advertiser to place their products to be engaged with by the User in any form, which when interacted with, monetizes the 5 Senses Ecosystem.

Any 5 Sense interaction Tagged as "5S engagement" has the potential to be monetized through samples provided by a company who sponsors a particular hotspot. For example, the advertiser can send samples of the cookie dough to the User, to be filled in the cartridge and when the related promotion which is placed as part of the content either as a direct advertisement or as a cooking show playing the baking of a cookie, and the User is prompted to print a cookie from the cartridge, is an act of direct engagement with the advertiser's product and the same can be measured in order to be monetized.

Each 5 sense engagement by the User is tagged in the system with metadata on the specifics of the interaction. Thus, for each different type of sense interaction, the system may tag/store metadata about the particular sense interaction, the duration of the sense interaction and a type of sense interaction that is being most often interacted with by a user. For example, for a scent user interaction, the system may tag the particular scent released, duration of the release and the scent family that is being engaged with often. The Content Deliverer and/or Content Provider can track the consumer's engagement every step in the process and also a bounce rate for each of the 5 Senses experience available to be delivered. The bounce rate is the percentage of visitors who enter the site and then leave ("bounce") rather than continuing to view other pages within the same site.

The advertiser pays the Content Provider for each engagement by the Consumer. The payment could be layered for each level of engagement. For example, for Food printer, if the User engages with the Hotspot to check the detail page on the ingredients to be added, for the item to be prepared, that's first level of engagement. If the User proceeds to print the item after checking the ingredients or alternate ingredients, to print the food item, that's advanced engagement and accordingly there will be multiple payment slabs. Each payment slab is a rate range for the advertisement based on the user interaction. For example, a first level of engagement by a user will have a lower rate range and the next and subsequent levels of engagement (for example like the user printing the item) will have a incrementally higher rate.

Similarly, for a particular video frame that carries the hotspots for both smell and Entertainment commerce, where the product for example is a Perfume, where the user smells the perfume or related smell while watching the content, that's first level of engagement and if the User proceeds to make a purchase of the perfume tagged in the video frame for Entertainment commerce purposes, that's a second level or advanced level of engagement, which will be monetized at a different rate. For example, if a particular User searches for a specific five sense (5S) content to engage with any of the 5 senses and proceeds in engaging with the same, then the keyword search term carries a value based on the density of search term and similarly for all searched and consumed 5S content where the User engages with at least one of the senses. Another example of engagement is when there is a digital interactive signage and if a User walks by the signage and it presents the user with one of the interaction opportunities and the User engages with the interaction, will be considered as an engagement. This digital signage could be set up with 5 Sense interaction opportunity by Z5X as required by the advertiser and each engagement with any of the 5 senses will be determined as an engagement for the advertiser to pay as per the predetermined rates. For example, a digital interactive signage at a bus stop has 3000 walk by in a week and about 100 interactions which are activated by the User through a click of the button/call for action, or actively waiting to engage with any of the 5 senses.

The Advertiser(s) can obtain the data of consumer's 5 senses engagement from the Content Provider in order to customize and target the right audience. The consumer's User data is collected through the Profile or Registration information collected during the initial set up. The consumer's data is collected and provided through a unique ID created for each consumer, instead of the direct consumer information data. When the User seeks targeted 5 Sense advertisement, the User signs up for the same and complete information of the User is shared with existing and potential advertisers.

The bidding process for advertisers for hotspots may be based on the demographic data that shows an inclination to watch a particular content and the advertiser placing the advertisement on that particular content or based on the search term value density for keywords as described earlier. The highest bidder for a particular search term or for a particular frame of the content would be entertained to place their 5 sense interaction opportunity and necessary pre-requisites for the engagement, if any, like a perfume cartridge, cookie ingredient cartridge, etc., will have to be shared with the User demographic by the advertiser, similar to perfume samples or small face cream sample packets that we receive in mail. The User can add the necessary sample cartridges in the scent diffuser device or food printer device before beginning to watch the content and engage with any of these senses. The instructions to add these cartridges will be provided along with the sample being sent or at the detail page of the content the describes the pre-requisites, if any, for 5S (five sense) engagement.

As shown in FIG. 1, the system and method may provide an ultimate connected device in the living room of the consumer to enhance the entertainment, shopping and education experience of the user. The entertainment devices or applications available currently in the market do not cater to all 5 senses of the human while the disclosed system and method caters to all five senses together or individually as the consumer prefers, by integrating modules/devices designed to cater to each of the five senses. The system and method integrates devices for each of the five senses into a unified experience based on what's required for the content.

Figure 9:
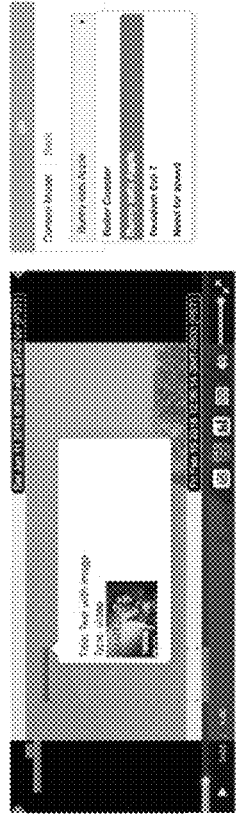
FIG. 9 illustrates an example of the Hot Spotting Screen, where the video content is mapped with Hot Spots of different sense experiences.
Figure 9:
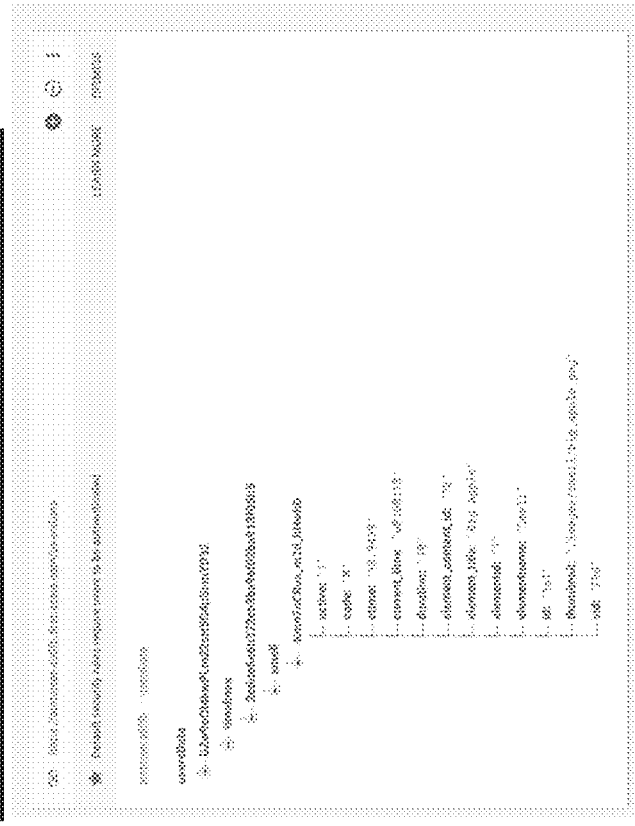

In one embodiment, the system may encode the piece of content with markers that time-codes the video content for different senses with sense bugs. Thus, the system may use these time codes to synchronize the various five or six senses and the interaction by the user using the five or six senses depending on the embodiment of the device. A user will have the ability to create new content or import existing 3.sup.rd party content into a cloud based portal interface that is part of an interactive content delivery system 106 that is part of the overall system 100. Once the content is loaded into the portal interface, the portal interface may provide the capability to move across various frames and scenes of the content and hotspot the relevant sections with associated sense bugs. As shown in FIG. 9, elements 900/901 are a user interface system that provides the ability to attach (hotspot) a sense experience to a scene or a segment of content. The drawing 902 shows how various sense hotspots are attached and tracked to the video content. The system may use a dynamic cloud based synchronization technique to attach and store these hotspots to the content. Once the hotspots are associated with the relevant sections of the content with the sense bugs (as described below), this configuration of the content (with the timestamps, hotspots and sense bugs for particular scenes) may be stored on the cloud platform (such as in the storage element 106C that is part of the interactive content delivery system 106) associated as a time-code association to the third-party content or the uploaded original content. When such a piece of sense encoded content is played by a device 102, such as an intelligent video player, a television, a watch and any other device that has the capability to permit display of the interactive content and interaction with the interactive content, the device 102 shown in FIG. 1 may extract the sense bug for the appropriate scene/frame and display the visual indicator on the screen. In the system, the user can interact with the sense bug to activate the sense bug to experience the additional dimension/sense of the content. Some of the sense bug may be involuntary—for example, a scent bug activates involuntarily on its own based on the scent map and the scent graph without having to have the user interact with the system. Sense bugs that do not require a user input or action will be executed involuntarily. For example, when a smell bug is encountered, the device 102 may message the smell hardware module 104B to automatically disperse that corresponding smell and that smell will be mixed accordingly and dispersed. On the other hand a sense bug involving touch will need the user to be close to the system and only activated when the user is ready.

In one embodiment, the system may have different modules/devices for each of the senses which could work together or individually as a standalone system. Each of the modules has one or more connectors that transfer power and data between the modules/devices once the modules/devices are stacked on top of each other. There are multiple possible combinations of these systems.

The interactive content system and method may be used to generate/drive revenues in various manners. For example, in the system and method, a base device (for example a user interaction device 102 in FIG. 1) may be sold to a consumer who is going to interact with the content being delivered to/stored in the base device. The system may then have one or more additional sense devices (devices 104A-104E in the example in FIG. 1) that may be sold separately from the base device or subsidized by an advertiser and may be sold by the company that also sells the base device or by the advertiser. For example, in one embodiment, a smell device 104B that generates a smell response based on the interactive content (such as for example a smell cartridge) or a taste device 104C (such as a 3D food printer cartridge) may be initially sold by a third party or a vendor in the market. In the system, an advertiser 108 may brand and pay for advertisements in the interactive content that may generate a response from one or more of the sense devices 104A-104E. For interactive content that may be a movie production, an advertising brand may pay for placement of logos, branded content, etc.

FIG. 1 illustrates a content interaction system and method 100 by which a user that has access to the user interaction device 102 may interact with content using one or more or all of their five human senses (e.g., sight, touch, smell, taste and sound). The system 100 provides a unified user experience that caters to all the five human senses. The system may have a plurality of user interaction devices 102 wherein each user interaction device 102 may be used by one or more users to interact with the content using the five human senses. Each user interaction device 102 may be, for example, any device (base device) by which a user may interact with the content using one or more of the five senses. In one example, each device 102 may be a television that allows the user to interact with the content using sight and sound senses and the user interaction device 102 may have one or more other sense devices (such as a smell device 104B, a taste device 104C and a touch device 104A) connected to the user interaction device so that the user can interact with the content using the five human senses. In other embodiments, the user interaction device 102 may have each of the five sense devices built into the user interaction device 102. In yet other embodiments, the user interaction device 102, may have some but not all the sense devices built into the user interaction device 102. Thus, the user interaction device 102 may be any device that may be used by a user to interact with content and may be hardware, software or a combination of both. As shown in FIG. 1, each user interaction device 102 may further comprise a user input device 103 (in addition to the sense devices) that allow the user to interact with the user interaction device 102, such as a remote device for activating the user interaction device 102 or changing the volume of the user interaction device 102.

The system 100 may further comprise an interactive content delivery system 106 that receives content and encodes the five sense interactive content that is delivered to each user interaction device 102. The interactive content delivery system 106 may be implemented using a server computer, other hardware devices or software (a plurality of lines of computer code) or a combination of hardware and software. As part of the encoding process (described below in more detail), the interactive content delivery system 106 may generate one or more timespots/markers and insert them into the content to indicate when one or more of the sense devices should be activated when the content is played on the user interaction device 102. Further, one or more advertisers 108 may connect to the interactive content delivery system 106, submit one or more advertisements and pay for the one or more advertisements to be associated with certain timespots/markers (and thus certain sense devices and sense interactions) in the content being delivered to each user interaction device 102. For example, a food company may pay for its advertisements to be associated with markers for the smell or taste sense devices. This provides one mechanism by which the sense interactive content experience may be monetized.

In the embodiment of the system in FIG. 1, the user interaction device 102 may have a sense interaction system 104 that is coupled to the user interaction device 102. As described above, other embodiments of the system may have one or more of the sense devices 104A-104E embedded in the user interaction device 102. Each of the sense devices may generate a different sense interaction so that the touch device 104A may provide a touch sense interaction, the smell device 104B may provide a nasal sense interaction, the taste device 104C may provide an oral interaction, the auditory device 104D may provide an audible interaction and the sight device 104E may provide a visual interaction. As described above, each of the sense devices may be triggered by a marker/timespot in the content wherein the content may include a unique marker/timespot to separately trigger each of the sense devices 104A-104E. In some embodiments, the sense interaction system 104 may further include a mind interaction device that is not shown in the example in FIG. 1 that is a five sense interaction device. For example, the content may display an edible product and have a timespot to trigger the taste device 104C to generate the displayed edible product. Each device 104A-104E may be housed in a single housing (as shown in FIG. 1) or each sense device 104A-104E may be housed in different modules/housings that may be stacked/coupled to each other. Thus, the above exemplary system contains multiple physical subsystems that can be separated or combined as a single unit, which when separated can be in near proximity to the consumer to create the optimal experience (Ex: Smell sensor or Touch Sensor). Once combined, the sense devices can operate together as a single unit. Thus, for example, an initial system for a particular user may have only 1-2 of the sense devices and then the user can purchase/acquire the additional sense devices and each user may have a different number of sense devices that can be triggered although the delivered interactive content may have the markers/timespots for each of the sense devices.

Each of the sense devices may be implemented as a combination of hardware and software. In one example, the touch device 104A may be a haptic feedback device, the smell device 104B may be a device that generates a particular smell in response to activation, the taste device 104C may be a device that generates food in response to activation (such as a 3D food printer/microwave oven), the auditory device 104D may generate audible interactions in response to activation (that may be the speakers of a television in some embodiments) and the sight device may generate visual interactions in response to activation (that may be the screen of a television in some embodiments). Each of the sense interaction devices 104A-104E may be a custom made device or it may be an off the shelf product that is commercially available. For example, a commercially available digital smell sensor (that may be used for the smell sense device 104B) may be the Cyrano product that is available from Vapor Communications, now called onotes, inc. (further information is available at onotes.com/that is incorporated herein by reference. As another example, the touch sense device 104A may be implemented using a commercially available product from UltraHaptics (further information is available at www.ultrahaptics.com/that is incorporated by reference herein). As another example, the taste sense device 104C may be implemented using a commercially available Foodini product made by Natural Machines, Inc. (further information is available at www.naturalmachines.com/that is incorporated herein by reference). The auditory capabilities are provided by standard High Definition sound processing systems built into the set-top-box. The resulting audio is played by the consumer's speakers systems. The visual capabilities are played back by the TV systems. However enhanced virtual reality experiences are created on 3.sup.rd party VR head set systems such as (but limited to) Samsung Gear VR (www.samsung.com/us/mobile/virtual-reality/gear-vr/gear-vr-sm-r322nzwaxar/) or Oculus Rift (www.oculus.com/rift/).

Alternatively to the embodiments described above, the system 100 may be implemented using the user interaction device 102 that includes software that runs on commodity set top boxes (STBs) or USB sticks and the sense devices 104 may be appropriate hardware (for instance, a 3rd party smell sensor) it can interact with it and create a similar immersive experience.

For the smell sense device 104B, the marker/hotspot associated with a smell sense may be associated with the content, either mapped one-on-one based on the scenes in the content or based on a scent graph that is derived on a user's scent preferences and the associated contents' smell map. A sense map or guide will be created that will be associated with the content based genres and other attribute preferences. Alternatively, the sense of smell feature may have theme centric content scent graph and scent map created, which would merge together to create a scent palette while the content is being played. The scent graph indicates the intensity of the scent and scent map defines where a particular scent trigger is activated in a particular content. The smell sense device 104B may have an import/export option that may be embedded into the video editor that identifies hotspots in the content.

In one embodiment, the touch sense device 104A (digital touch capability) may be based on ultrasound technology and can emulate or simulate tactile feedback based on the object depicted on the content. For example, in a movie with scenes of large monuments or buildings, the tactile feedback can also emulate the feeling of touching the miniature form of the building and this experience is created in real-time.

In more detail, the interactive content delivery system 106 may retrieve/obtain a piece of content (such as a video or other piece of content) and this content could be uploaded into the platform or the video links could be pulled from external systems such as YouTube, Vimeo and Netflix and others. The interactive content delivery system 106 may be a cloud platform that is a part of the system that will provide the ability to mark (hotspot) video frames with the additional sensor icons (bugs). When the marked content is played through the above system it will create the associated marked immersive experience. For example when a video is played, the system will detect the marker on the sequence of video frames and will visibly show on the screen the "sense bug" and will activate the appropriate sensor to create the digital smell or digital touch that is associated with the device. A key innovation is that the marker technology is external to any video content thus enabling any/all 3rd party video content to be marked so that a sense interactive piece of content may be generated from any piece of content.

In addition to the elements shown in FIG. 1, the system 100 may further include a neuroscience helmet that may be used to identify and capture heightening pulse or a spike in pulse of the user based on the user's interest. This data from this device may be used to determine a user's interest in each piece of particular content.

In the system 100, the markers may be automatically activated as the piece of interactive content is being played on the user interaction device 102 as described above. Alternatively, each marker for a particular sense interaction may be activated by the user's input based on the nature of the solution. For example, sense of smell trigger will activate automatically, while a touch sense (such as a virtual reality system) may be activated based on the user's selection.

In one embodiment, the user input device 103 may be a gesture-based sensory input device where the user will interact with the system. This will enable the consumer to select options to control the user interaction device 102 along with the virtual reality experience.

The touch sense device 104E may be a virtual reality (VR) device. The system may have, but not limited to, mobile VR capability, assuming the content has a marker for VR world or a VR scene and the scene will be marked to the content. In one embodiment, when a VR marker is played, the "scene bug" will appear and the user has the ability to transfer the screen from a large screen device to a mobile Z5 app and that will immediately display the VR content on the VR device. The user may have the ability to insert the device into his VR gear and view the VR world. The mobile application is smart enough to pause and resume the playback on the main Z5 system while the VR content is being viewed on the headset. The "Scene Bug" screen can also appear in the VR mobile app or a VR system and there are seamless handovers between the Z5 device and the mobile app or the VR system on the sessions. The interactive VR transfer between devices (mobile & TV) can be enabled like a phone call transfer between the mobile and car bluetooth technology and can also be used to socially transfer content to friends while watching.

The taste device 104C may be a 3D printer that is a part of its main system or a 3rd party system. If a 3D print marker is present based on the content, it has the ability to print the desired food item. In the system, the culinary content is associated with the marker and based on featured culinary shows. The selected items will be printed by the device— during the show and post the show. The system is intelligent to understand the time it takes to print items and will perform pre-preparation or printing so the item is ready during the show. For example, for busy parents can time the printing of cookies and snacks for kids when they come from school remotely after their TV time. The system may also have partnerships with advertisers and brands to create token food items to entice consumers during after or in between commercials.

The user may control the functions and operations of the user interaction device 102 in various ways. For example, a user may interact with one or more of the sense interaction devices 104A-104E in order to control the user interaction device 102. As an example, the user may use mid-air haptics and/or holograms (alone or together) to control the user interaction device 102.

Figure 1A:
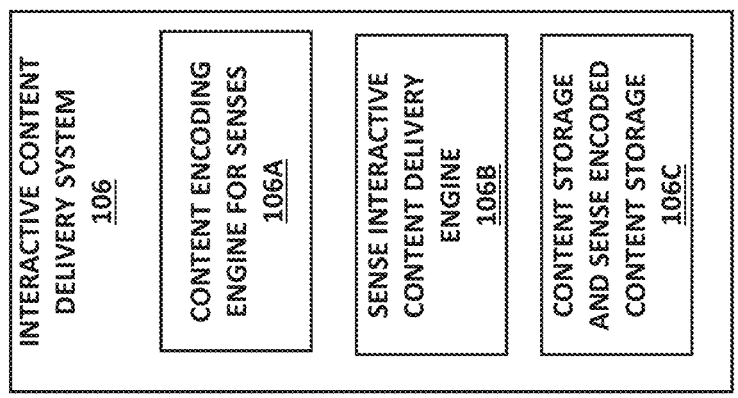
FIG. 1A illustrates more details of the interactive content delivery system that is part of the content interaction system.

FIG. 1A illustrates more details of the interactive content delivery system 106 that is part of the content interaction system 100. The interactive content delivery system 106 may further include one or more additional elements and each of these elements of the interactive content delivery system 106 may be implemented in hardware or software. When an element is implemented in hardware, each element may be hardware device, a specialized microcontroller and the like. When an element is implemented in software, the element may be a plurality of lines of computer code/ instructions that may be stored in a memory and executed by a processor of the cloud resources that host the element (blade server, server computer, cloud computing resource, etc.) so that the cloud resource/computer system is configured to perform the operations and processes of that element. The interactive content delivery system 106 may further include a content encoding engine for senses 106A, a sense interactive content delivery engine 106B and a content storage and sense encoded content storage 106C. The content encoding engine for senses 106A performs the encoding of a piece of new content or third party content with the timestamps, hotspots and sense bugs at different scenes in the content to make that content sense interactive. For example, the content encoding engine for senses 106A may provide a tool/user interface that allows an authorized user to edit/encode the content (whether new content or third party content) with the timestamps, hotspots and sense bugs. The sense interactive content delivery engine 106B may deliver, based on the content being viewed by the user, the appropriate sense encoded content to each user of the system 100 over a communications path that may be wired or wireless. The content storage and sense encoded content storage 106C may store the raw content (whether new content or third party content) and the sense encoded content so that the raw content may be encoded by a user of the system and the sense encoded content may be delivered to each device 102 of the system.

Figure 2A:
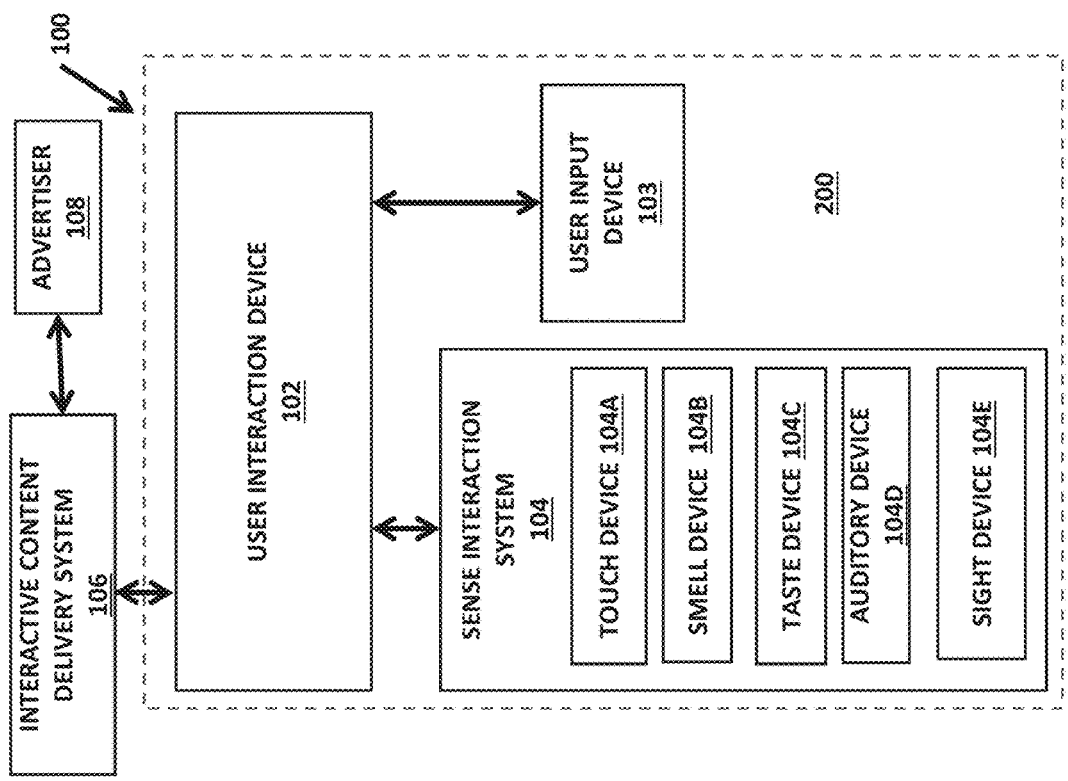
FIG. 2A illustrates an embodiment of the content interaction system and method in which the user interaction device, sense interaction system and user input device may be integrated into a piece of smart furniture.

FIG. 2A illustrates an embodiment of the content interaction system 100 and method in which the user interaction device 102, sense interaction system 104 and the user input device 103 may be integrated into one or more pieces of smart furniture 200. In this embodiment, each of the systems/devices 102-104 may be integrated into one or more pieces of furniture so that a user can sit on/be adjacent to the one or more pieces of furniture and then interact with the content in a similar way to the embodiment shown in FIG. 1. Alternatively, each of the systems/device may be removably connected to the one or more pieces of furniture so that the one or more pieces of furniture can be used for content interaction and then the systems/devices 102-104 can be moved to another piece of furniture. This alternative option allows a user to retrofit an existing piece of furniture, for example. Each piece of furniture 200 may include one or more processors that can perform the various operations and functions of the content interaction system, but may also act as a connected device as well. The interaction between the user and the content using the various sense devices 104A-104E occur in the same manner as is described below for the FIG. 1 embodiment.

Figure 2B:
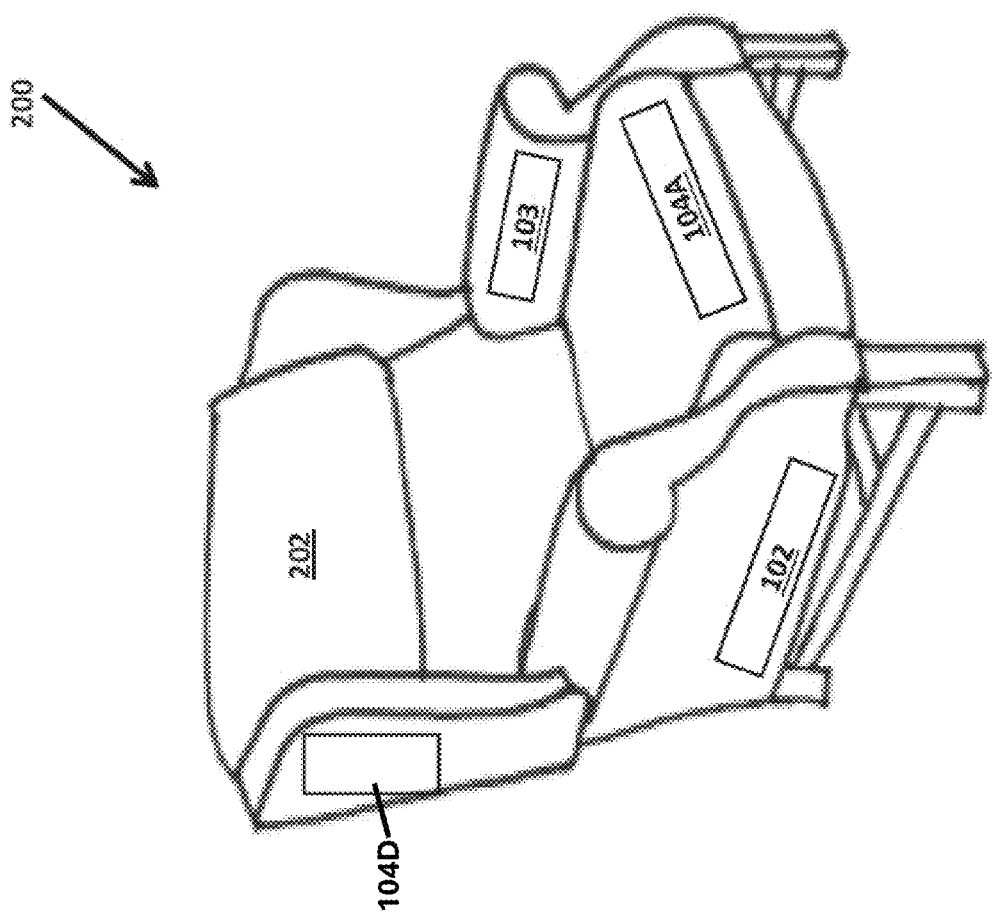
FIG. 2B illustrates an example of a piece of smart furniture into which the content interaction system may be integrated.

FIG. 2B illustrates an example of a piece of smart furniture into which the content interaction system 100 may be integrated. In this example, the piece of furniture is a chair 202. As shown in FIG. 2B, the chair may have the user interaction device 102, sense interaction system 104 and the user input device 103 integrated into the chair (shown integrated into the arm of the chair in FIG 2B, but it may be located in various places such as in the arm of a sofa or couch. Note that the particular location of each device or system shown in FIG. 2B is merely illustrative and the particular position may be changed or the device/systems may be removeable. In the example in FIG. 2B, the touch device 104A may be embedded into the seat of the chair so that the user sits on the touch device 104A when interacting with the content and the audio device 104D may be embedded into the side or back of the chair. The smell, taste and sight devices 104B, 104C and 104E may also be integrated into the chair or may be separate independent devices (see FIGS. 7B-7C for example) that may be located adjacent to the chair.

Figure 2C:
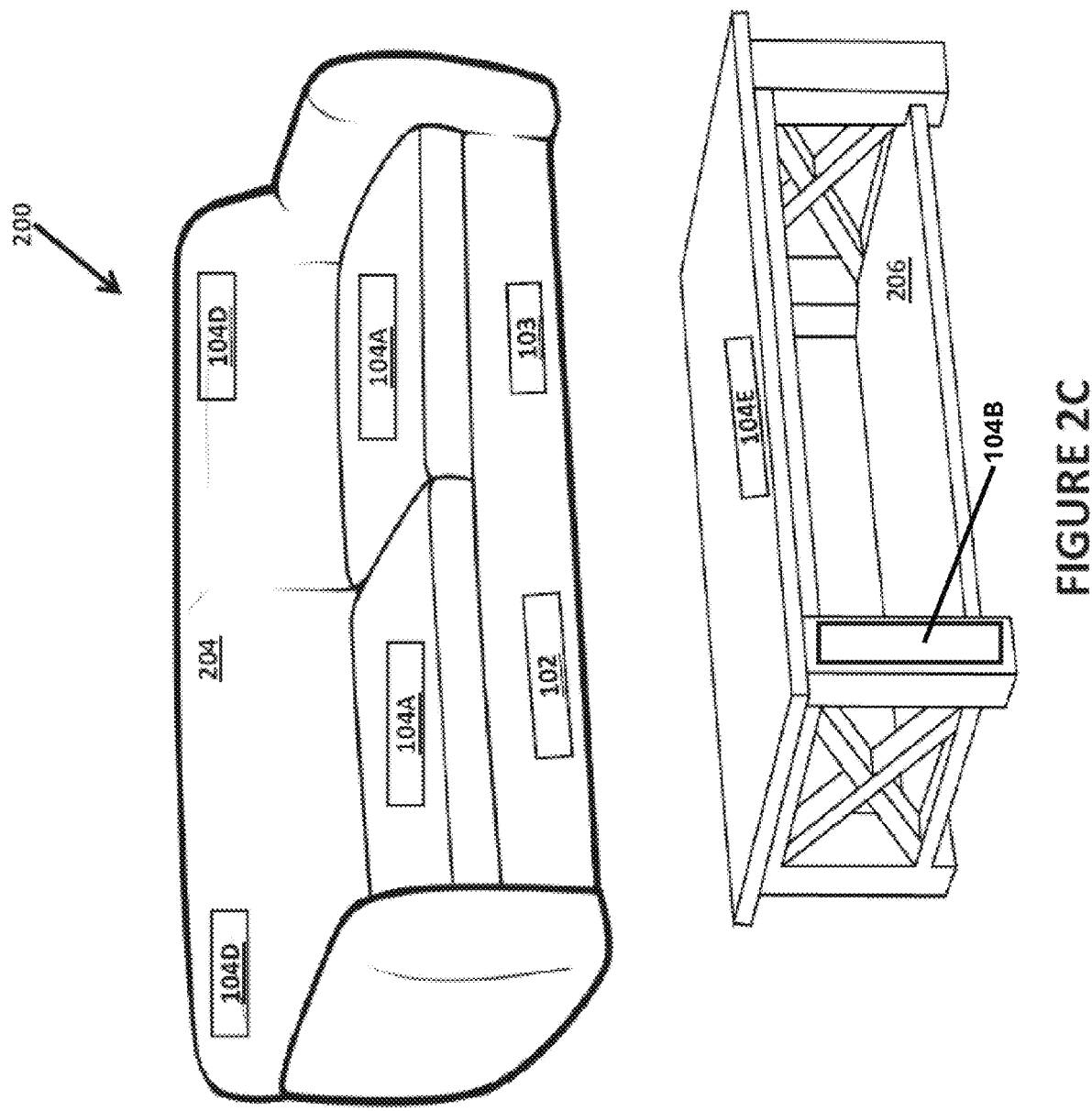
FIG. 2C illustrates another example of pieces of smart furniture into which the content interaction system may be integrated.

FIG. 2C illustrates another example of pieces of smart furniture into which the content interaction system may be integrated.

In this example, the one or more pieces of furniture 200 may include a couch 204 and a coffee table 206 that are located adjacent to each other. In this example, the couch 204 may include embedded 3D audio speakers or directional audio speakers (the auditory device 104D) and a haptics/tactile module (electronic) embedded device (the touch device 104A) that can provide motion to the User when sat on it and also provide different temperature experience, in accordance to the content being watched. As above, the particular locations of the devices shown in FIG. 2C are illustrative only. The coffee table 206 may include the smell device 104B (including scent perforations to emit scent to the User in accordance with the content) and the sight device 104E (the coffee table top would have a glass panel on top that could convert into a holographic display panel, to project holographic images in accordance with the content or the sight device 104E may be on top of the coffee table shown in FIG. 2C. In either of the examples in FIGS. 2B and 2B, the user interaction device 102 also may be external to the piece of smart furniture.

In either of the examples in FIGS. 2B and 2C, the one or more pieces of furniture provides the content interaction experience (in a living room) for any content that is brought in and annotated through a 5 sense ecosystem/5 sense authoring cloud as described below. In the system, the 5 sense experience is provided through the one or more pieces of furniture and the sense markers in the content that trigger each different sense interaction.

The smart furniture (examples of which are shown in FIGS. 2B and 2C) also may integrate with various device that are capable of connecting to the Internet or WiFi (collectively "Internet connected devices"), such as Alexa, Google, other voice assistants or other devices and act as a hub for the household and the connected devices. Furthermore, the smart furniture can be integrated with/connected to health related devices that check a heartbeat or weight of the user or other health data.

In addition, certain sense devices may be used to control the user interaction device 102 and/or the user device 103. For example, the touch sense device, such as a haptic device, or a sight sense device, such as a holographic device, may be used as the user device 103 to control the display of the user interaction device 102 and/or to select content being presented to the user by the user interaction device 102.

Figure 3:
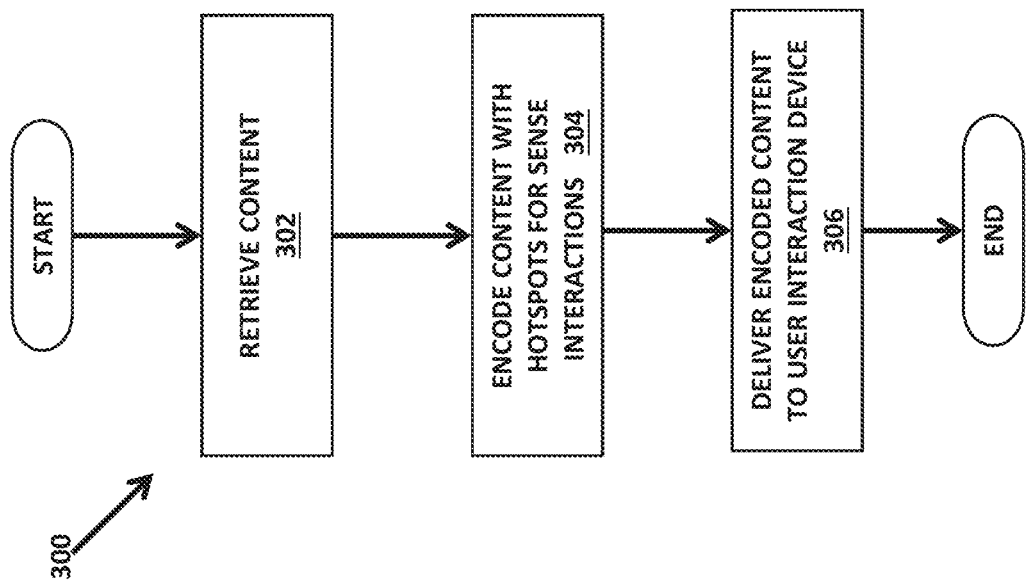
FIG. 3 illustrates a method for generating sense based interactive content.

FIG. 3 illustrates a method 300 for generating sense based interactive content. In one example, the above described content encoding engine for senses 106A may be used to perform this method. However, the method 300 may also be performed using different/other hardware that would be within the scope of the disclosure. In the method, content is retrieved (for third party content) or generated (for new content) (302). The content is then encoded with the timestamps, hotspots and sense bugs (304) for one or more scenes of the content to encode the different sense interactive into the piece of content. Each hotspots and/or sense bug may include data about which sense device is being triggered and what response is expected from the sense device. For example, a hotspot for the smell sense device may include data/instructions about a particular smell to be generated by the smell sense device. Similarly, the hotspots and/or sense bugs for the other sense devices would have similar data. The method may then delivery the sense encoded content to each user interaction device 102 (306).

Figure 4:
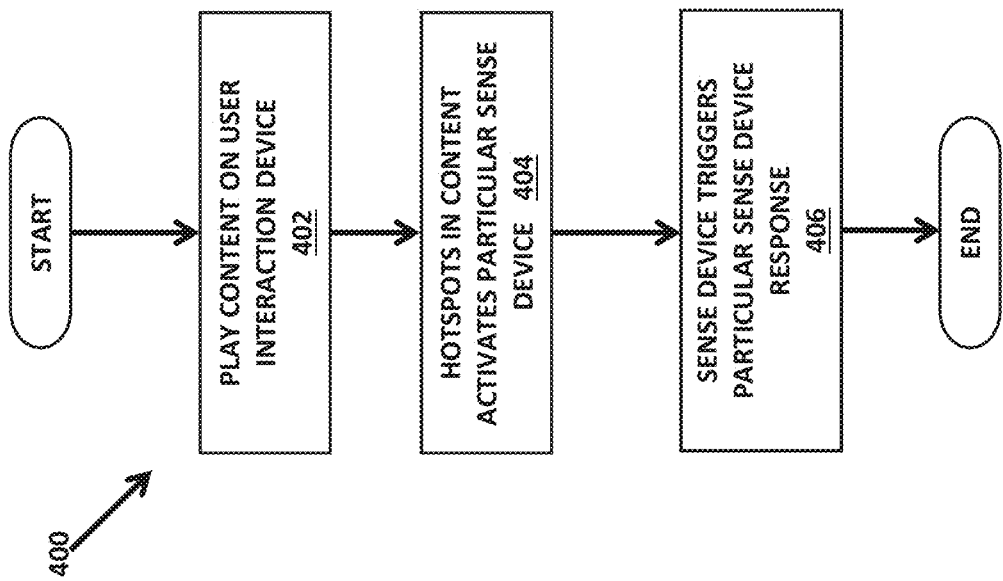
FIG. 4 illustrates a method for interacting with the sense based interactive content.

FIG. 4 illustrates a method 400 for interacting with the sense based interactive content. In one example, this method may be performed by a combination of the user interactive device 102 and the sense interaction system 104. However, the method 300 may also be performed using different/other hardware that would be within the scope of the disclosure. In the method, a particular piece of encoded content may be played on the user interaction device 102 (402). As described above, the hotspots and sense bugs embedded into the content may be involuntarily triggered or triggered by a user action. Thus, the hotspots in the content may activate a particular sense device (404) and the particular sense device may generate a response (406). For example, for the smell sense device, the sense device may emit a smell based on the hotspots or sense bug.

Figure 5:
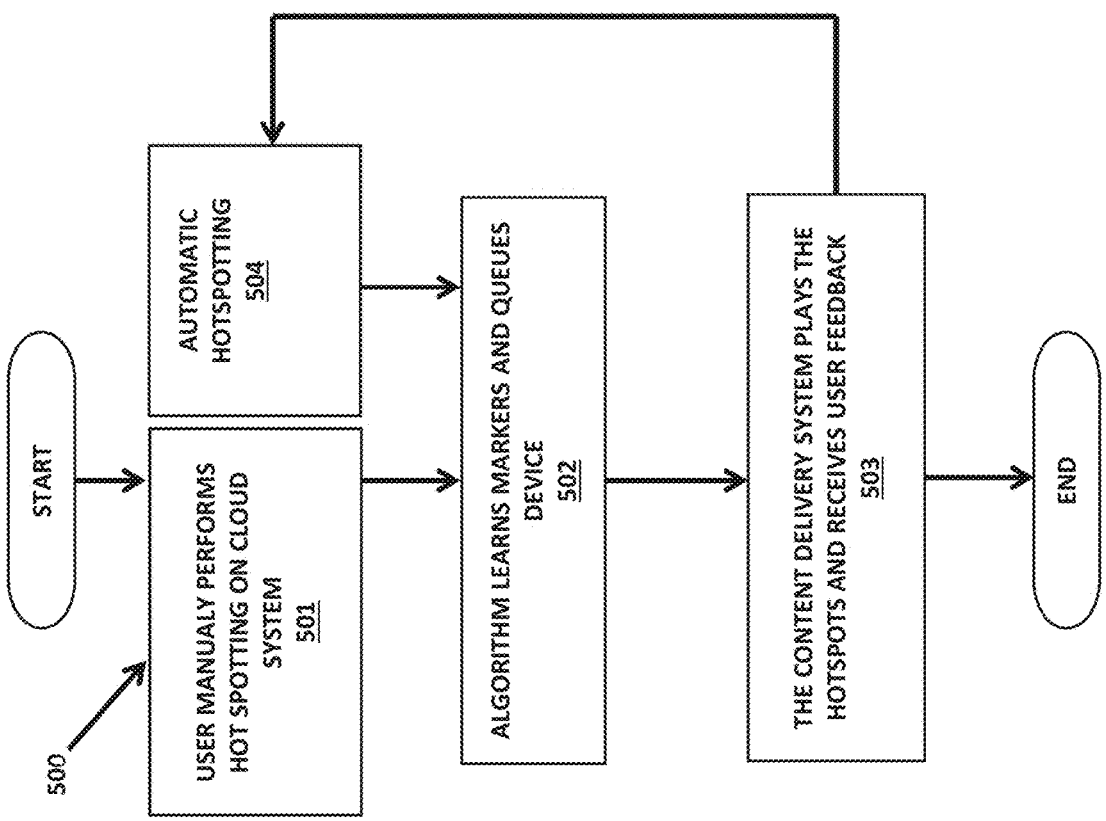
FIG. 5 illustrates an example of a technique for learning and automatically hot spotting content with scent, virtual reality and touch elements.

FIG. 5 illustrates a method 500 for learning and automatically hot spotting content with scent, virtual reality and touch elements. The user may initially perform manual hotspotting (manually insert the hotspots in the content) using the system (501) as described above. As the content system (503) is learning and getting feedback from the user about the user inserted hotspots, the system may learn (using an algorithm or machine learning techniques) to provide automatic hotspotting (504) in addition to the manual hotspotting. In one embodiment, an algorithm (502), such as clustering algorithm, may learn the hotspots and markers and then automatically queues the sense devices so that the device 102 and sense system 104 may encode, on the fly, a piece of content instead of required previously encoded sense content. This type of learning and automatic hot spotting is possible for all senses and not limited to Scent.

Figure 6:
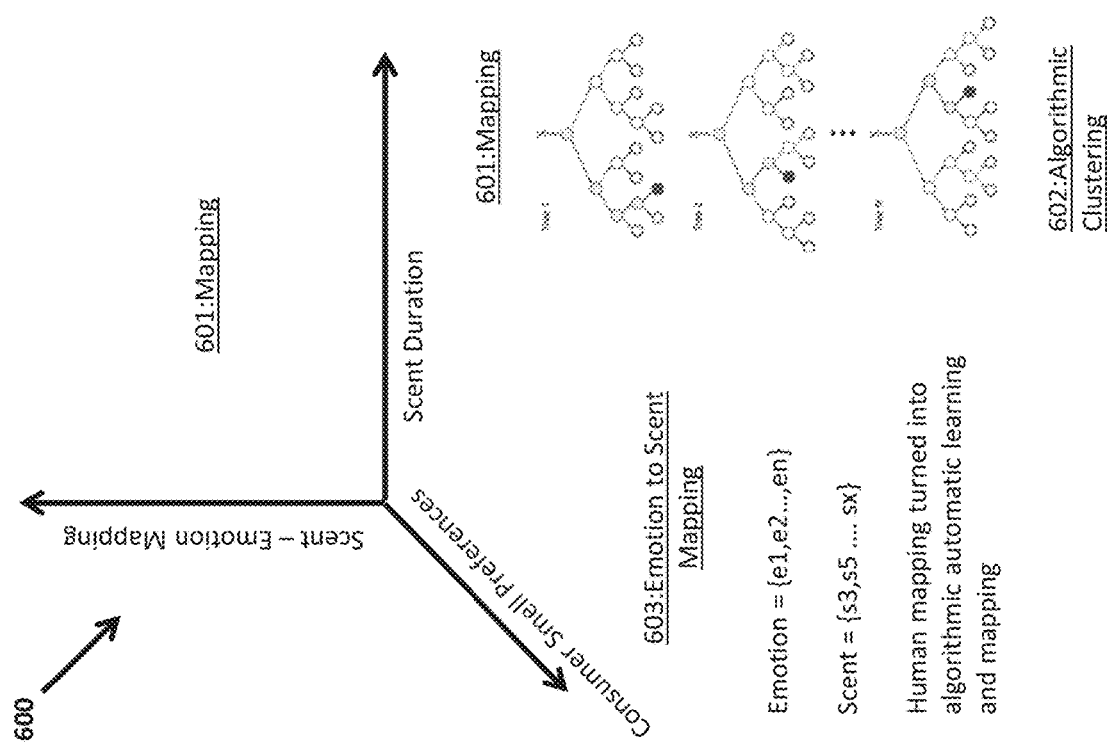
FIG. 6 illustrates an example of mapping technology employed by the system to connect scent elements with the scenes of the video content.

FIG. 6 illustrates an example of mapping technology 600 employed by the system to connect scent elements with the scenes of the video content. Thus, FIG. 6 illustrates an example of the algorithm 502 referenced above with respect to FIG. 5 that may be used for the automatic hotspotting. It is noted that the system may have similar processes/method for automatic hotspotting for the other sense devices. The algorithm may perform a mapping 601 in which the system considers three elements to make a judgment on what duration at which to play any give scent. As shown, each scent may be mapped to an emotion on any given content. A subset from the list of human emotions as shown at simple.wikipedia.org/wiki/List_of_emotions#/media/File:Plutchik-wheel.svg) are captured for across a content. These emotions are manually mapped by an administrator or a consumer on the cloud based portal. However, after learning the mapping and gathering statistically significant information the system, the algorithms will map the emotion, scent and duration tuples 601 into a clustering algorithm 602 that performs a range of cluster techniques such as random forest and K-nearest neighbors etc. on that data to determine suitable scent tuples for any given emotion sets. It is also possible to tag emotions via speech recognition of the audio track or the convolutional techniques employed on video the goal is to achieve scale. The resulting system, for example, may map the emotion [Happy] with the smell [Lavender]. This mapping is derived via learning from all the thousands of manual mapping that is done across various videos. The value of the automated clustering is not just determining the mapping of a single emotion to a single smell but rather its sequence its neighboring emotions and its neighboring smells. We use a nearest neighbor clustering algorithm similar to described in the below webpage www.analyticsvidhya.com/blog/2014/10/introduction-k-neighbours-algorithm-clustering/) with feedback and the ability incorporate learned and derived behavior.

Figure 7B:
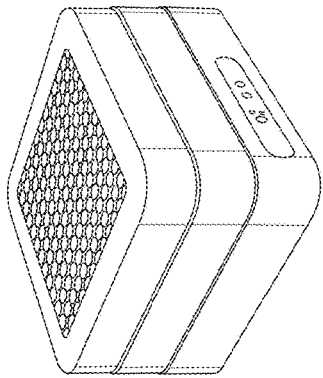
FIGS. 7A-7C illustrate examples of the device form factors, components and possible colors for production.
Figure 7A:
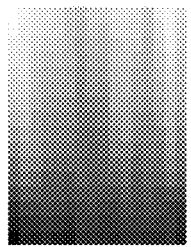
Figure 7C:
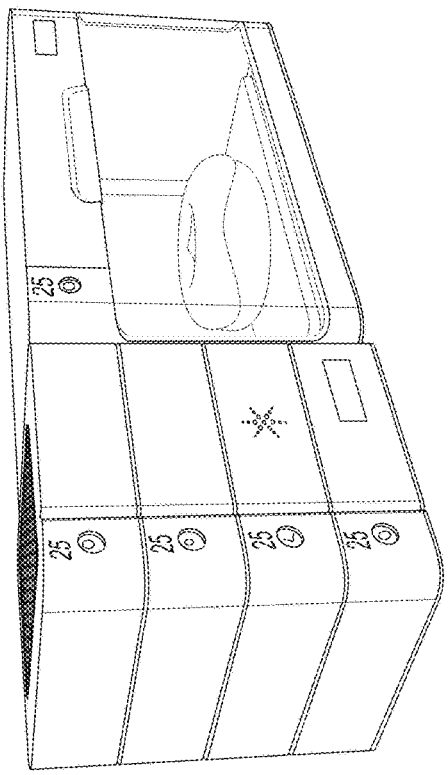

FIGS. 7A-7C illustrate examples of the device form factors, components and possible colors for production. For example, FIG. 7A illustrates all of the different colors that may be used for the user interface device 102, the sense system 104 and/or each of the individual sense devices 104A-104E as shown in FIG. 1. FIG. 7B illustrates another example of the sense system 104 with three sense device modules stacked on top of each other that may also include an external 3D Printer for the taste sense device 104C. FIG. 7C illustrates yet another example of the sense system 104 with four sense device modules stacked on top of each other and an attached 3D Printer for the taste sense device 104C. In accordance with this disclosure and as described above, many different configurations of the sense devices are possible and the system is not limited to any particular configuration.

Figure 8:
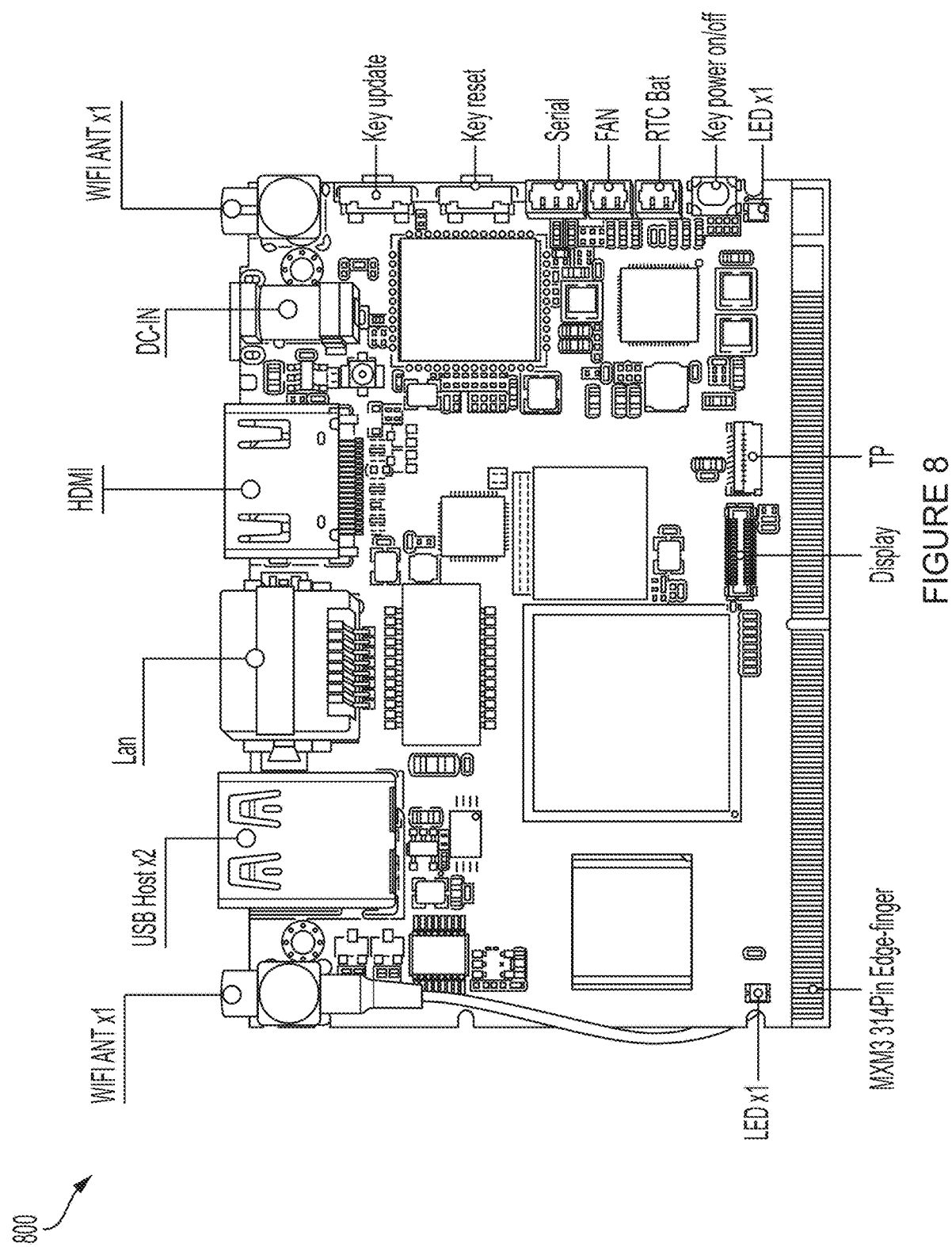
FIG. 8 illustrates the baseboard—content delivery system hardware with logical components.

FIG. 8 illustrates the baseboard 800—content delivery system hardware with logical components. The video (Visual)/playback sense system is central to the system and may be referred to as the "Base", an example of which is shown in FIG. 8. The Base 800 may contain the necessary power and charging mechanisms for the other systems and various hardware elements shown in FIG. 8. The base may also contain an intelligent video player that can extract the sense bug associations and disperse commands to other systems and sense devices. The base can exist in the form of hardware or software. The smell and the touch systems can be stacked on top of the base and charged by inductive touchless mechanism or a touch based power connector. The 3D food printing component is adjacent can will be powered by the above mechanism. The 3D food printing component may also be in the kitchen and communicate via WIFI with the home connected device. They communicate through a proximity protocol such as Bluetooth low energy or a discoverable WIFI nodes. The system works individually and syncs with the rest of the module once stacked on top of each other. The base system performs a discovery routinely for its own sense hardware components or associated 3.sup.rd party hardware components. When a scan detects a device it is automatically asked to join and depending on the security privileges the joining operation is authorized.

The configuration of the system 100 and the sense system 104 may be, for example: Base System Software Only running on a 3.sup.rd party set top box and detecting 3rd party sense devices Base System Hardware and software detecting and communicating to all other sense devices that are 3.sup.rd party supplied. Base System and few own sense devices along with 3.sup.rd party devices A full suite of owned system that has all contains the base and all sense systems.

The baseboard 800 shown in FIG. 8 provides the modular stacking of the sense devices for synching that may be used with the furniture described above. Alternatively, the furniture may not use the modular stacking, but may synchronize automatically at regular or defined intervals.

In one embodiment, the monetization system and method may be implemented as a plurality of lines of instructions/computer code resident in the interactive content delivery system 106 in FIG. 1, in the user interaction device 102 in FIG. 1, and/or resident in both the interactive content delivery system 106 and user interaction device 102 in FIG. 1 wherein the processors in each element containing the lines of instructions execute the instructions to implement the interactive content monetization system and method.

Figure 10:
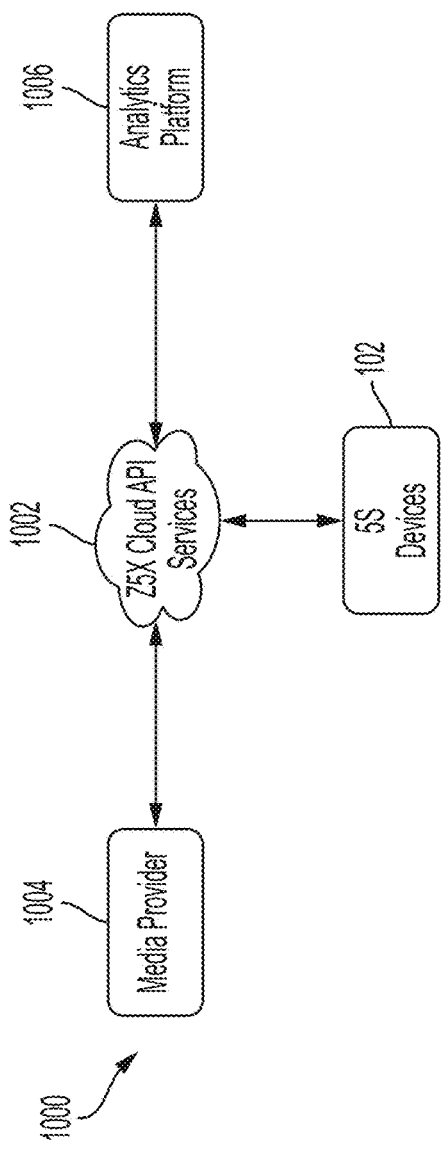
FIG. 10 is a high level view of a cloud based implementation of an interactive content monetization system.

In another embodiment, the content interaction system may have an interactive content monetization system 1000 may be implemented using a cloud computing architecture as shown in FIG. 10 in which one or more user interaction devices 102 as described above (shown as five sense (5S) devices in FIG. 10) may couple to a cloud based backend system 1002 that has cloud API services that are accessed by each device 102 using application programming interface (API) calls. The backend 1002 may also provide APIs for media providers/advertisers 1004 to post contest/advertisements and bid on particular hotspots as described below. The backend 1003 may further include API interfaces to an analytics platform 1006 that performs many of the interactive content monetization processes such as a bidding process, etc.

Figure 11:
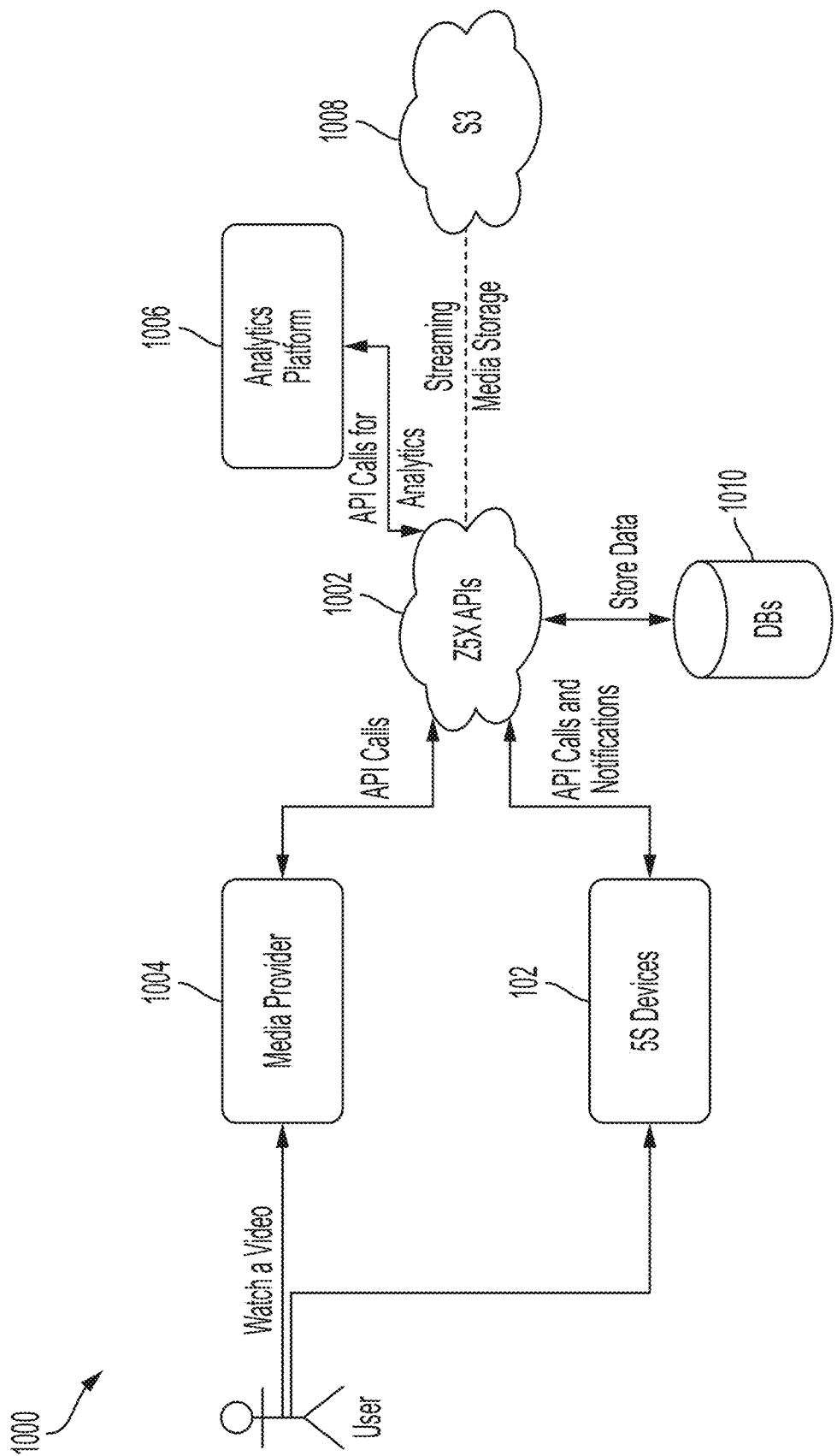
FIG. 11 is another view of the cloud based implementation of the interactive content monetization system.

FIG. 11 is another view of the cloud based implementation of the interactive content monetization system 1000 showing the interactions between a user and his/her device 102 being used to provide the interaction content, the media provider 1004, the backend 1002 and the analytics platform 1006. As shown in FIG. 11, the backend 1002 may further have a streaming media store 1008, such as S3, for storage of the interactive content and other data of the system and one or more databases 1010 for various types of data like user data and Store data. In one embodiment, the backend 1002 may have various pieces of software executed by a processor of a cloud computing resource and one or more cloud services. The software of the backend 1002 may be implemented, for example, using Android, NodeJS, MondoDB and Elasticsearch and the cloud services may be implemented using Google Firebase, AWS S3, RDS and Redshift.

During an interactive content session, a user may view a piece of media content, such as a movie from a media provider 1004 that is part of the system. The media provider 1004 may interact and exchange data with the backend 1002 using a set of API calls. FIGS. 20A and 20B illustrate an example of a hotspot metadata request and response, respectively. In particular, in the example request and response shown in FIGS. 20A and 20B, the Media Provider (1004) calls Cloud Services API (1002) 3 times with proper inputs Timeframe (current time): 20, 38, 87 and the Media Provider (1004) calls the Z5 Cloud API Services' (1002) scent API with proper inputs. According to the Media Provider's (1004) request, the Z5 Cloud API Services (1002) will call the Scent device API on connected device and save the data in Z5X cloud database, examples of which are shown in FIG. 20B.

Each device 102 may also interact and exchange data with the backend 102 using API calls and notifications. For example, in this case the Cloud API Services (1002) calls the API of connected 5S devices (102) which are external to the Z5 Platform like ONotes or Foodini, etc and we store only 'Active' when the device received information from Foodini and activated the device or 'Failed' when we did not receive the API response from Foodini, etc and the device was not activated to play the 5 Sense response.

Similarly, the analytics platform 1006 may interact with and exchange data with the backend 1002 using API calls for analytics. For example, the Analytics Platform (1006) provides data visualization of the 5S activities for the Dashboard, which is saved on the Z5X Cloud Database when the Media Provider requested it. To provide the data visualization in multiple forms like different charts, the Analytics Platform (1006) calls the Z5X Cloud Services API (1002) to retrieve data from the cloud database.

Figure 12:
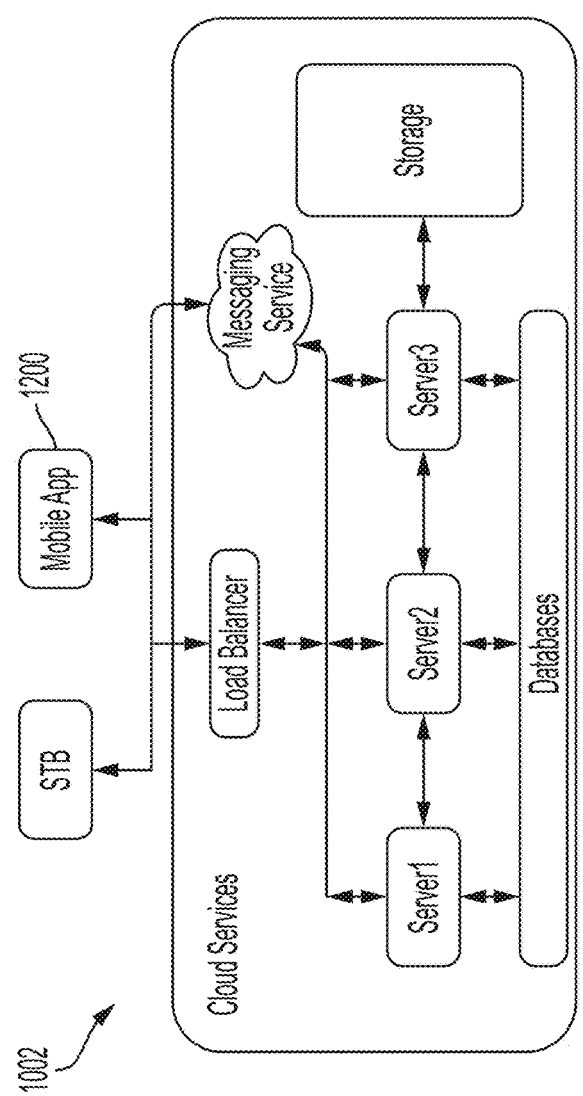
FIG. 12 illustrates an example of the cloud based interactive content monetization system back end.

FIG. 12 illustrates an example of the cloud based interactive content monetization system back end 1002 that can interface with a mobile app, application and/or browser 1200 executing on a device 102 or with a set top box as described above. As shown, the backend 1002 may be implemented using cloud services that may include the known cloud services computing elements (servers, databases, load balancer, storage and/or messaging service) shown in FIG. 12. The novelty of the interactive content monetization system is not in the known cloud architecture shown in FIG. 12, but instead in the software and hardware in the system and backend that implements the unconventional interactive content system and interactive content monetization system and method (and sub-processes such as the bidding process) described elsewhere in this disclosure.

Figure 13:
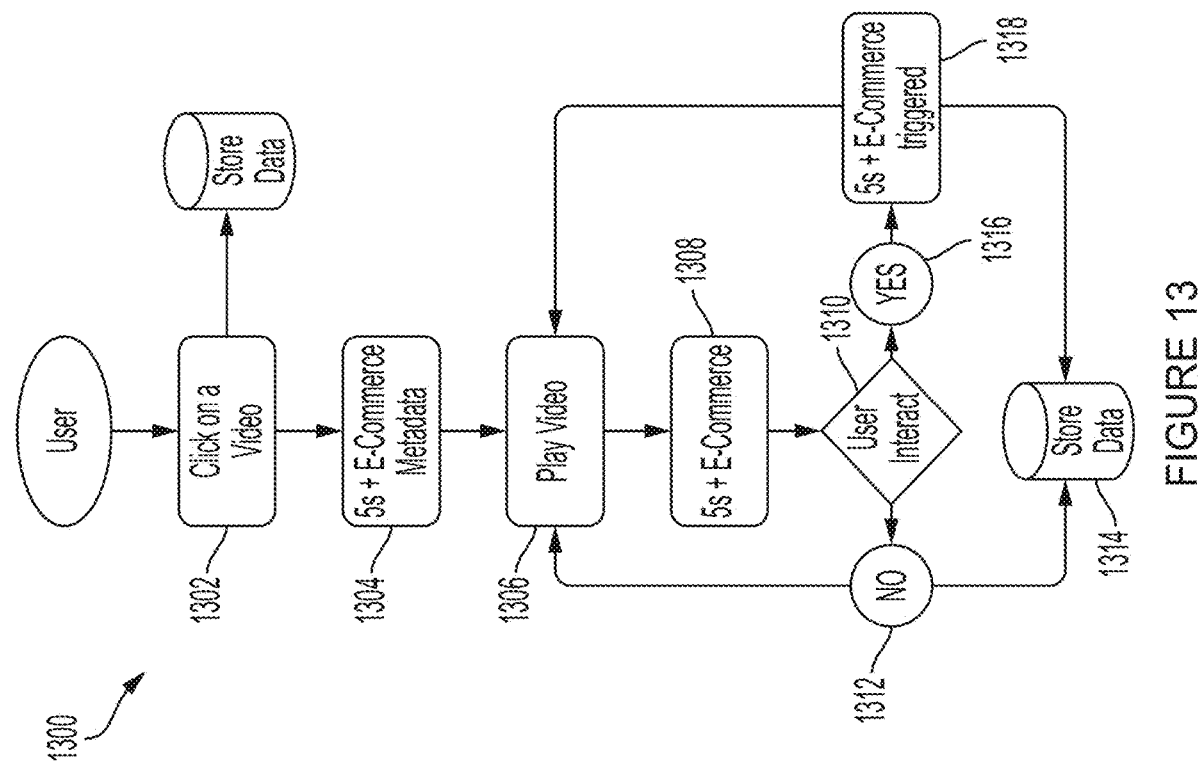
FIG. 13 illustrates a method for interactive content monetization.
Figure 14:
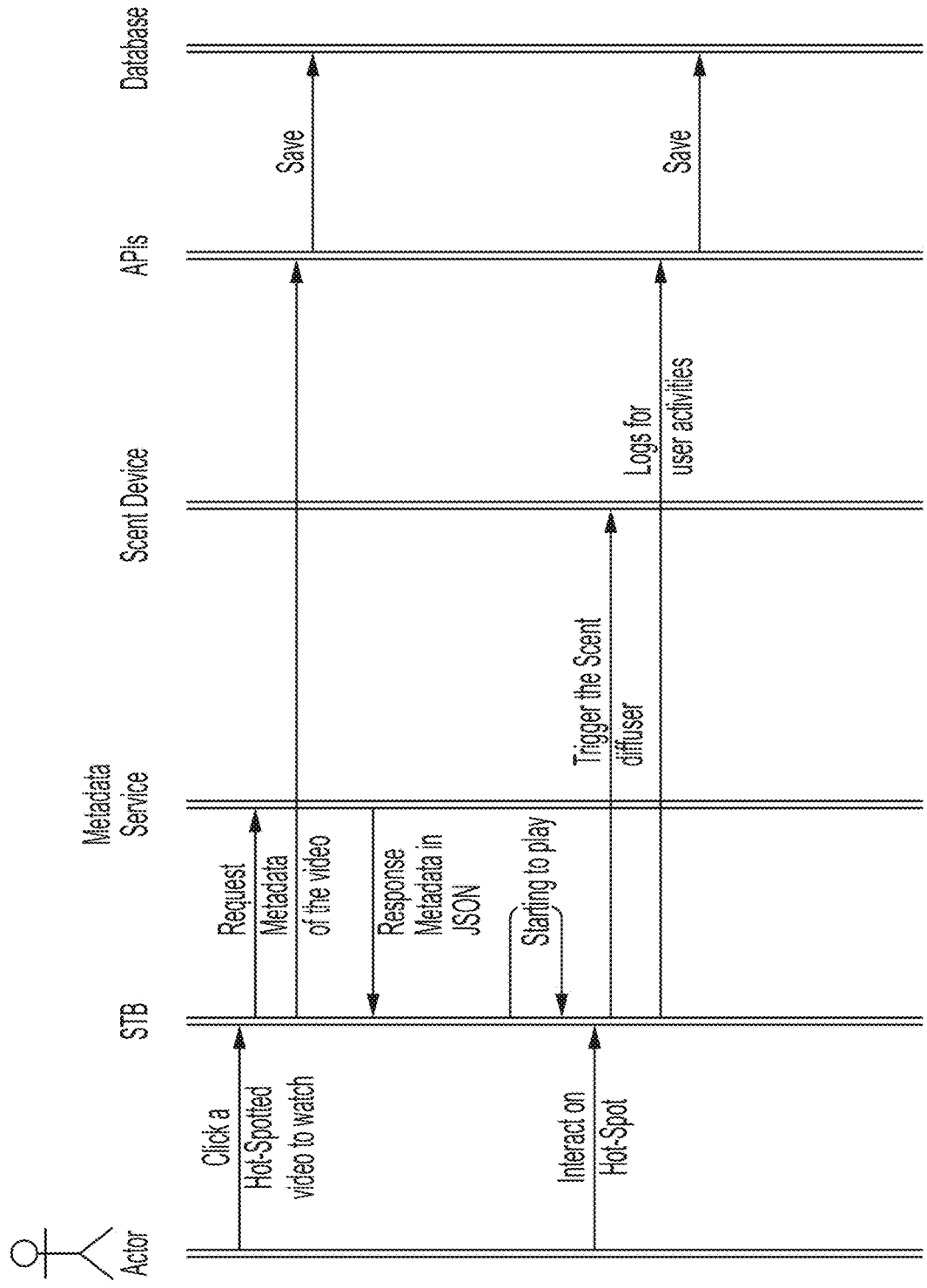
FIG. 14 illustrates a data flow during the interactive content monetization.

FIG. 13 illustrates a method 1300 for interactive content monetization that shows the interaction of FIG. 11 in more detail. A user may click (1302) on a piece of interactive media content, such as a video. Note that the piece of interactive media content has been previously encoded as described above with hotspots that allow the user (either by action or passively) to interact with the content through the five sense devices as described above. The system may store data about the user into the system database when the user clicks. The user is then provided with the piece of interactive content (1403) (including the content and the hotspots (the five sense (5s) data)) and the ecommerce metadata that includes data about the monetization for each hotspots in the content. The piece of content is then played (1306) so that the 5s content and the ecommerce material (1308) are available to the user. The user is given an opportunity to interact with each hotspot for a period of time described below in more detail (1310). If the user does not interact with the particular hotspot (1312) that data about the user choosing to not interact with the particular hotspot is stored (1314) and the piece of content will continue to play (1306) until the next hotspot in the piece of content. If the user chooses the interact (1316), that the particular sense associated with the hotspot is triggered as well as the ecommerce action (1318). The user choice to interact is stored by the system and the content will continue to play (1306). In this manner, the user is given an opportunity to interact with each hotspot that has a particular sense and ecommerce tied to the hotspot. FIG. 14 illustrates a data flow during the interactive content monetization process shown in FIG. 13 in which the entities include the user, the set top box, a metadata service that is part of the backend 1002, one or more scent devices 104A-104E, the API interfaces and the system storage.

Figure 15:
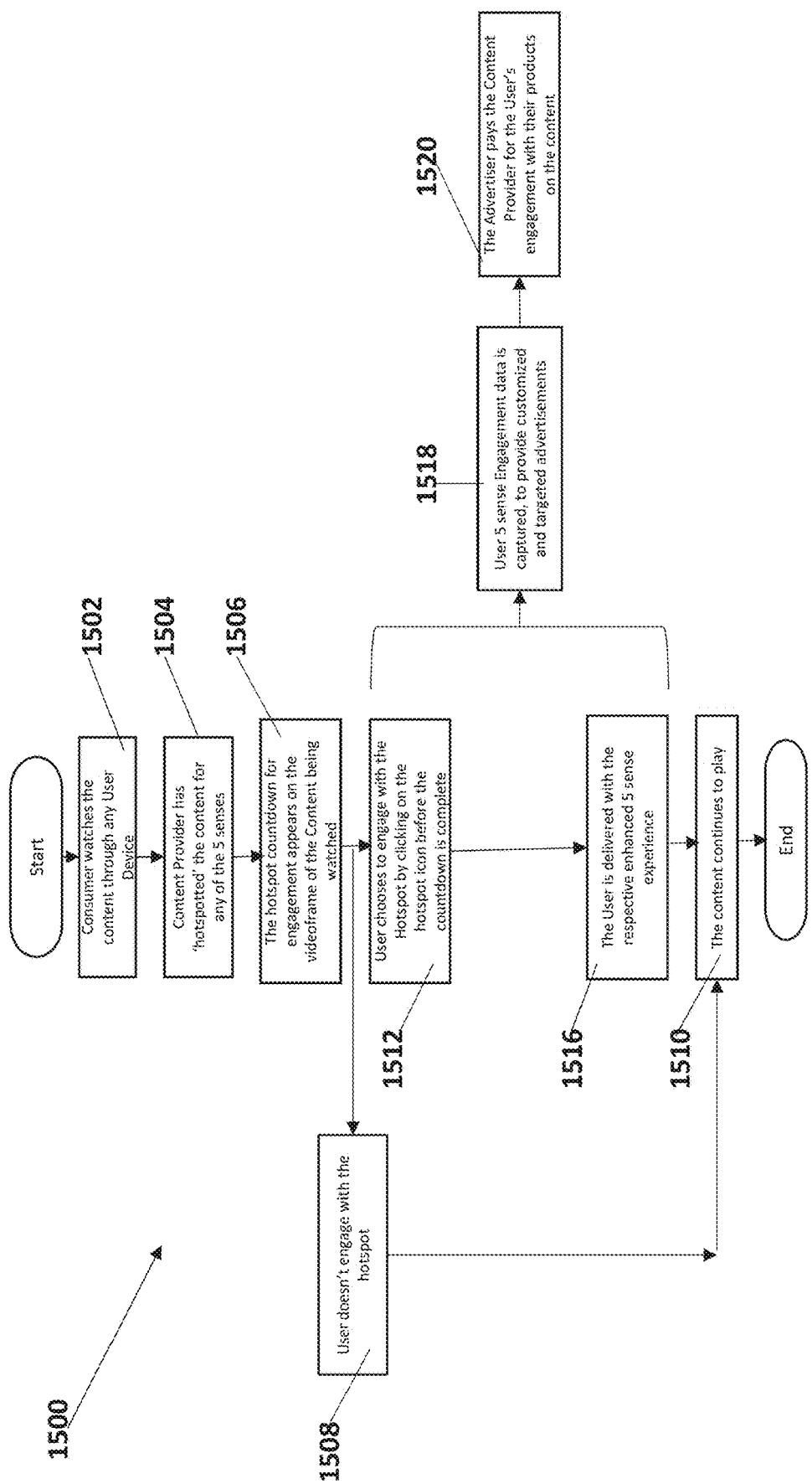
FIG. 15 illustrates more details of the method for interactive content monetization.

FIG. 15 illustrates a method 1500 for interactive content monetization. The user/consumer may watch/absorb the content using the user interaction device 102 and television as described above (1502) and the content being consumed by the user may have one or more portions of the content hotspotted for any one or more of the five senses (1504). Each hotspot is an opportunity for an advertiser/company who purchased the hotspot and its particular sense marker to engage and interact with the user while the interactive content system receives compensation for that interaction. The compensation will be based on the bidding process and model described above and the incremental level of engagement by the user that will affect the rate charged for the engagement.

When a user consumes interactive content that has a hotspot, a hotspot countdown for engagement appears on the frame of the content being consumed (1506). For example, the preferred count down time may be 5 seconds and an example of a hotspot count down user interface that may be displayed to the user is shown in FIGS. 18A-19B. If the user does not engage the hotspot within the countdown period (1508), the content continues to play (1510) until the next hotspot is reached. If the user does engage with the hotspot by interacting with the hotspot, such as clicking on a hotspot icon, before the countdown expires (1512), the user is delivered with a particular sense experience associate with the hotspot (1516) and then the content continues to play until the next hotspot (1510).

When the user interacts with the hotspot, the engagement data of the user is captured and used to customize and target additional advertisement for the particular user (1518). Then the advertiser pays the content provider for the user's engagement with their products in the content (1520). In this manner, the user interactions with the interactive content are being monetized.

Figure 16:
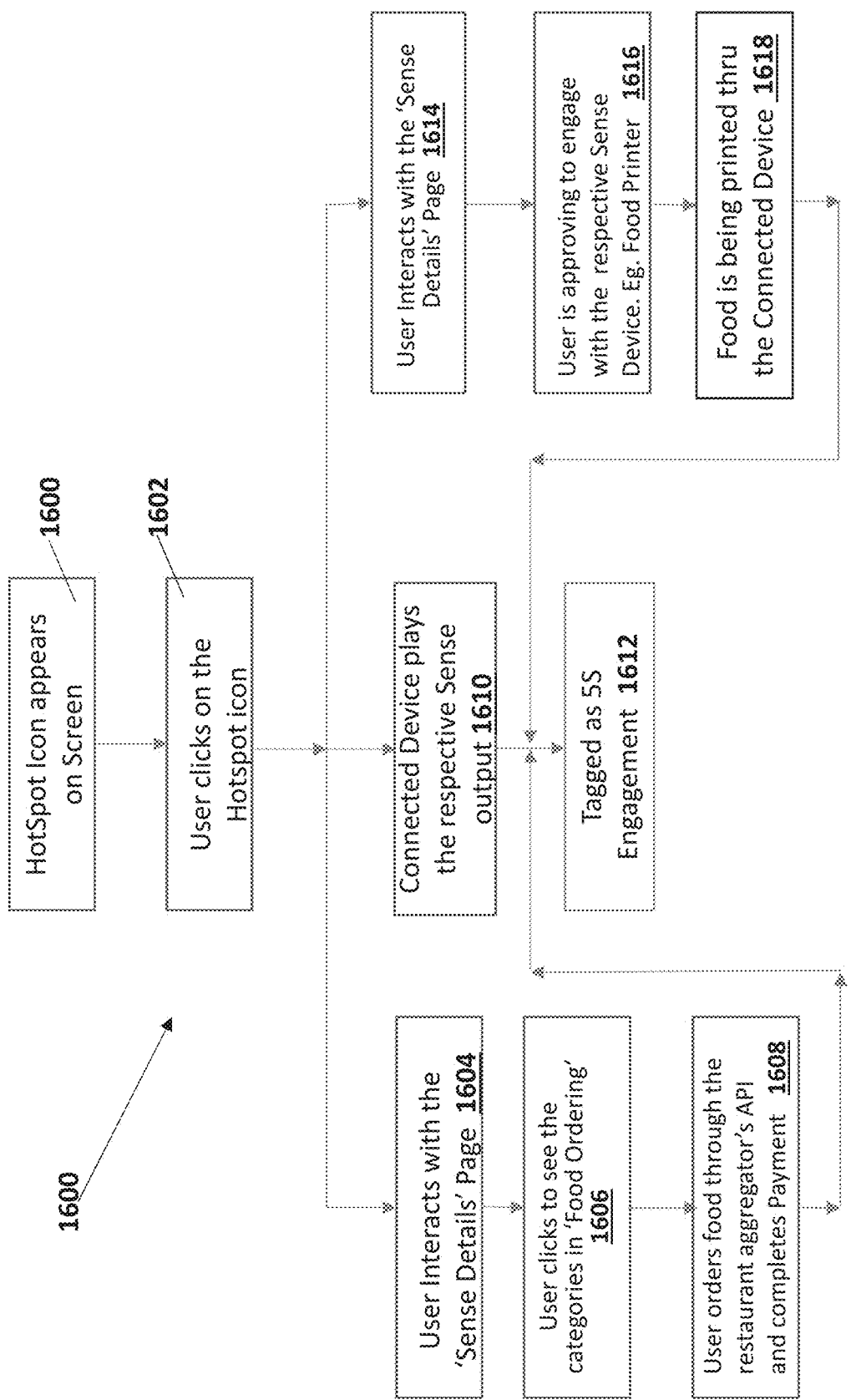
FIG. 16 illustrates further details of the method for interactive content monetization.

FIG. 16 illustrates further details of the method 1600 for interactive content monetization and what can occur when a hotspot appears (1600) and a user clicks on the hotspot (1602). The user may interact with a sense detail page (1604) that is associated with each hotspot. In an example in which the sense of the hotspot is the taste sense, the user may click to see the categories in "food ordering" (1606). The user may then order food through the restaurant aggregators (Uber Eats, DoorDash, etc.) API and completes the payment for the food (1608). When there is no sense detail page, for example, the user can activate the sense, such as Olfactory (Smell), engagement at the Settings page, then the scent will be released at a particular hotspotted frame and that engagement would be considered a $2^{ND}$ level or deep engagement.

During the interaction, the connected sense device may produce the respective sense output (1610). The monetization system may tag that interaction as a five sense engagement (1612) and then connect data about the engagement as described above.

In a different interaction, the user may interact with the sense details page 1614 and the user approves engaging the respective connected device, such as a food printer for a taste sense (1616). Then, the food shown in the content/requested by the user is printed using the connected device (1618) in the example in which a taste sense hot spot was interactive with by the user.

Figure 17:
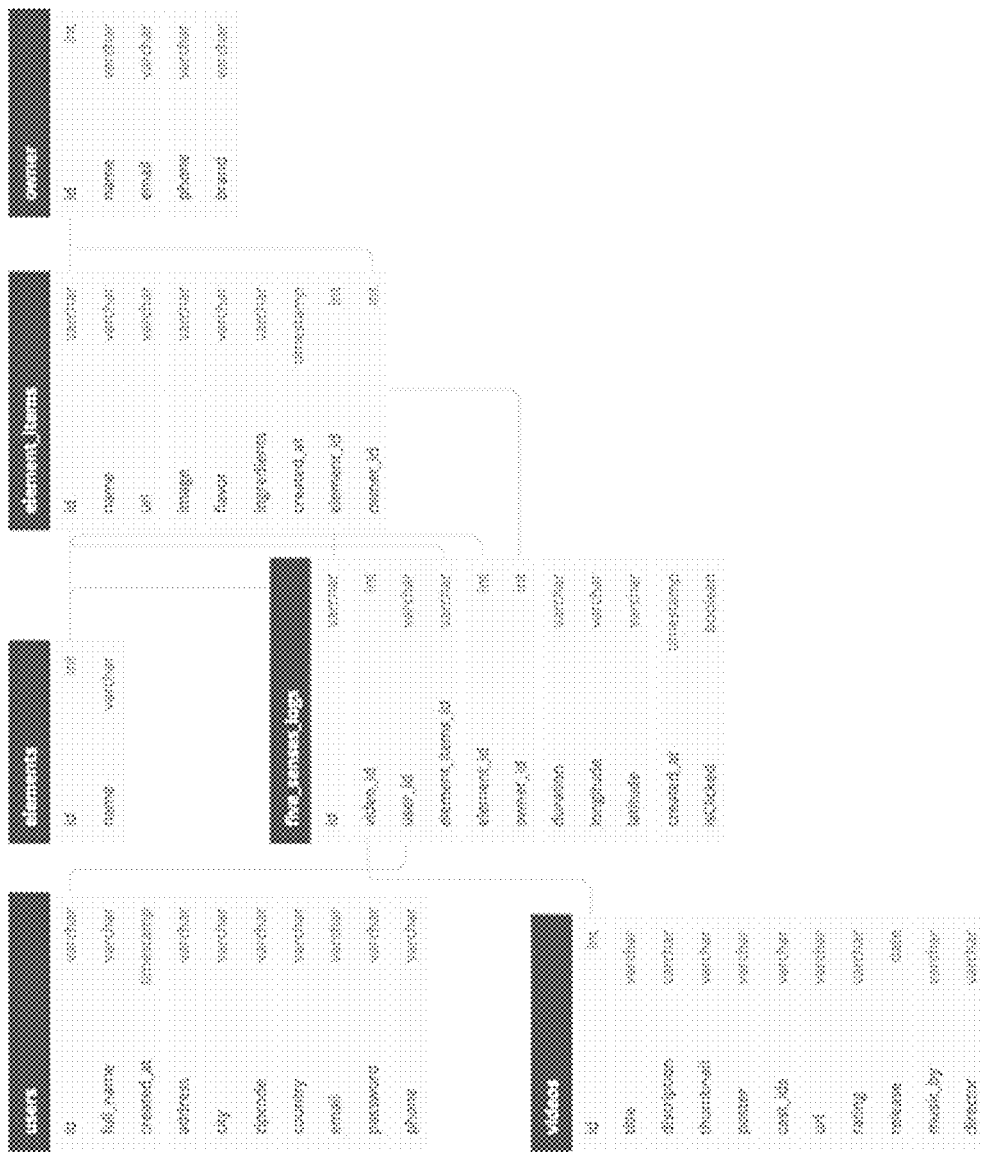
FIG. 17 is an example of the data schema for the store of the content monetization system.

FIG. 17 is an example of the data schema for the store of the content monetization system. The data scheme may include a user data structure, a videos data structure, an elements data structure, a five senses logs data structure, an element items data structure and an owner data structure shown as relational/linked records in FIG. 17. These data schema allows the system to store the various data used to provide the interactive content, to trigger the scents, to manage the interactive content monetization and store the data about the user's interaction that may be used during the bidding process to adjust the rate for a particular portion of a particular piece of content.

Figure 18A:
FIGS. 18A and 18B illustrate an example of a hot spot count down user interface for an ecommerce opportunity.
Figure 18B:
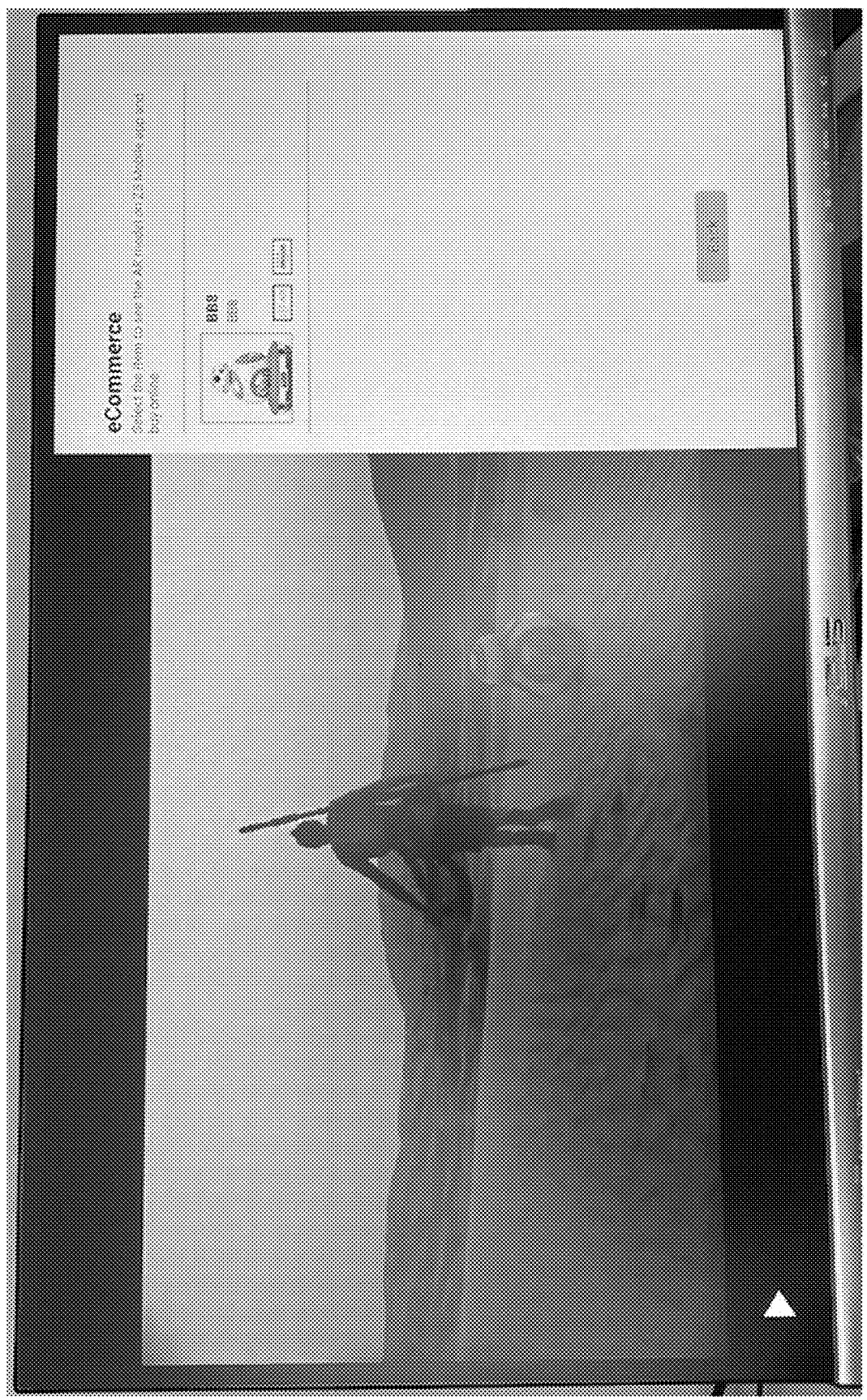

FIGS. 18A and 18B illustrate an example of a hot spot count down user interface for an ecommerce opportunity in which FIG. 18A shows a piece of media content (a movie) in which an ecommerce hotspot has been reached as shown by a shopping cart icon on the display. Furthermore, the time in which to interact with the hotspot is shown by the "5" on the display which indicates 5 seconds of time to interact with the hotspot since the number counts down. FIG. 18B shows a user interface when the user interacts with the hotspot (within the time period). In this ecommerce example, a user interface that allow the user to purchase the droid being shown in the movie is presented to the user.

Figure 19A:
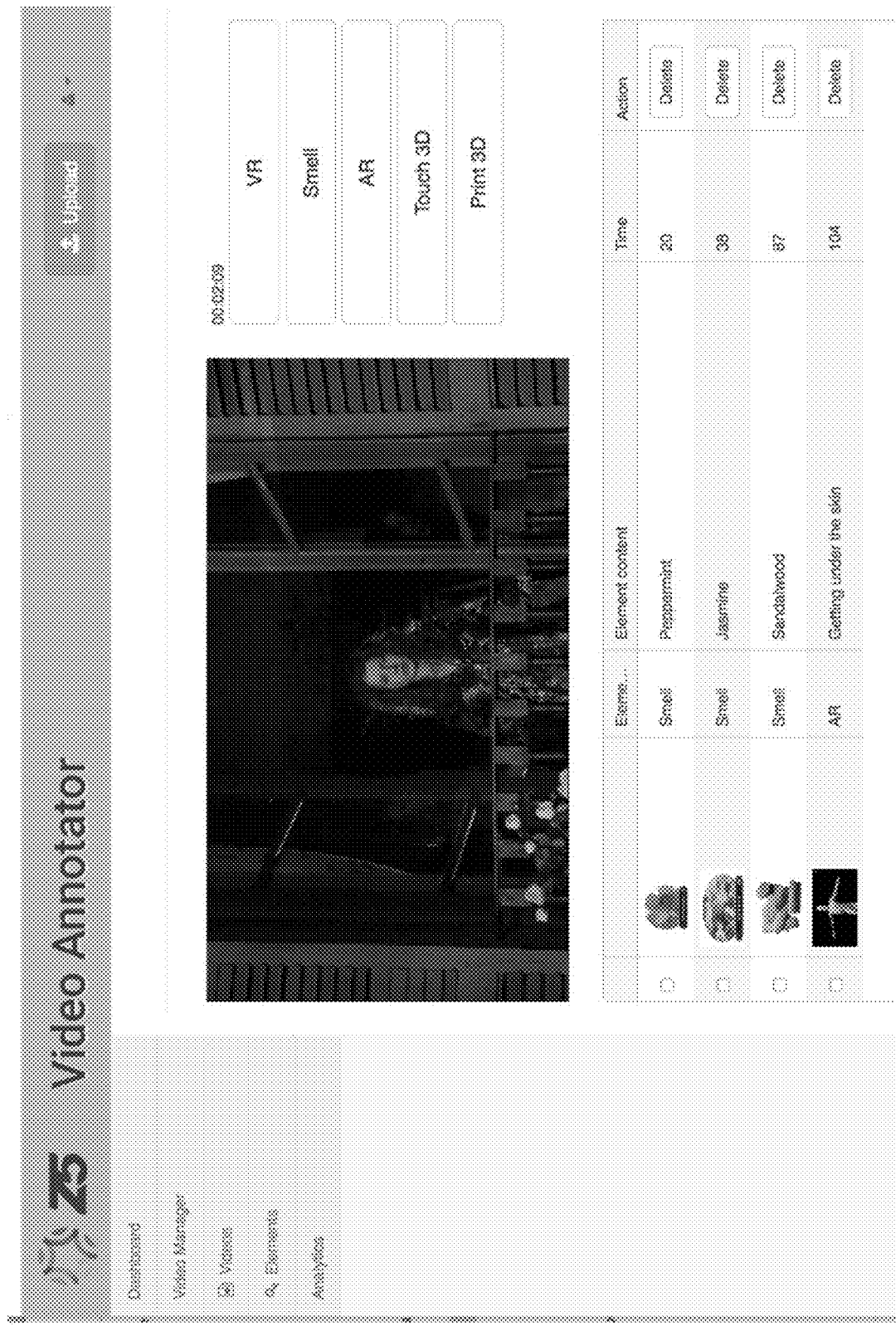
FIGS. 19A and 19B illustrate an example of a user interface for setting a sense hotspot duration.
Figure 19B:
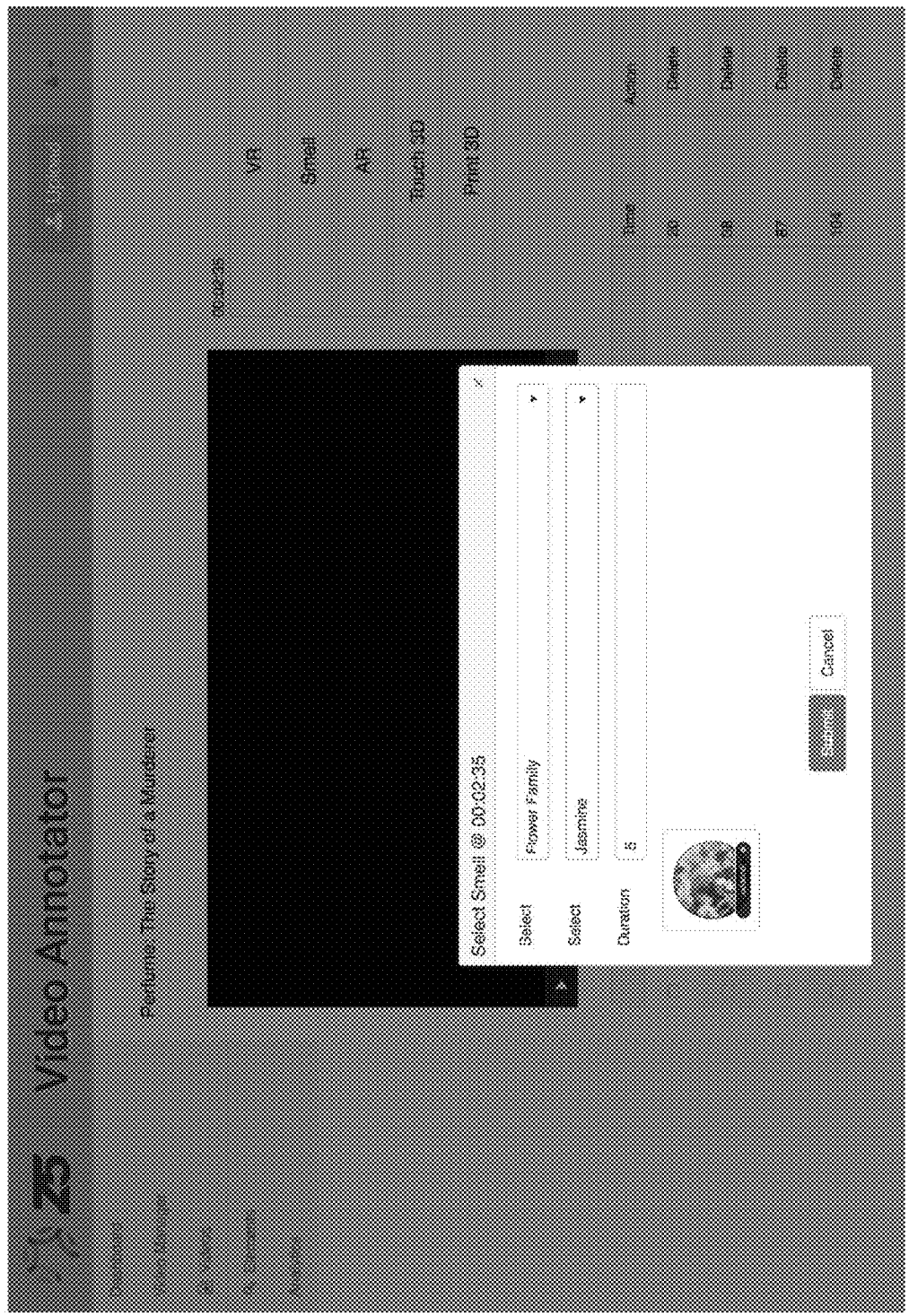

FIGS. 19A and 19B illustrate an example of a user interface for setting a sense hotspot duration. For example, FIG. 19A shows a content annotator that allows different portions of the piece of content (a scene at 2 hours and nine minutes shown in the example) to be encoded with a sense markers (VR, smell, AR, Touch 3D and Print 3D in this example). The user interface, for each sense, allows the user to define the element content (peppermint, jasmine, sandalwood or getting under the skin) and a time to interact for each hotspot. FIG. 19B shows the user being able to adjust the type of sense from a pull down menu, the sense element (Jasmine in the example) from a pull down menu and enter a duration time.

The foregoing description, for purpose of explanation, has been with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as are suited to the particular use contemplated.

The system and method disclosed herein may be implemented via one or more components, systems, servers, appliances, other subcomponents, or distributed between such elements. When implemented as a system, such systems may include and/or involve, inter alia, components such as software modules, general-purpose CPU, RAM, etc. found in general-purpose computers,. In implementations where the innovations reside on a server, such a server may include or involve components such as CPU, RAM, etc., such as those found in general-purpose computers.

Additionally, the system and method herein may be achieved via implementations with disparate or entirely different software, hardware and/or firmware components, beyond that set forth above. With regard to such other components (e.g., software, processing components, etc.) and/or computer-readable media associated with or embodying the present inventions, for example, aspects of the innovations herein may be implemented consistent with numerous general purpose or special purpose computing systems or configurations. Various exemplary computing systems, environments, and/or configurations that may be suitable for use with the innovations herein may include, but are not limited to: software or other components within or embodied on personal computers, servers or server computing devices such as routing/connectivity components, hand-held or laptop devices, multiprocessor systems, microprocessor-based systems, set top boxes, consumer electronic devices, network PCs, other existing computer platforms, distributed computing environments that include one or more of the above systems or devices, etc.

In some instances, aspects of the system and method may be achieved via or performed by logic and/or logic instructions including program modules, executed in association with such components or circuitry, for example. In general, program modules may include routines, programs, objects, components, data structures, etc. that perform particular tasks or implement particular instructions herein. The inventions may also be practiced in the context of distributed software, computer, or circuit settings where circuitry is connected via communication buses, circuitry or links. In distributed settings, control/instructions may occur from both local and remote computer storage media including memory storage devices.

The software, circuitry and components herein may also include and/or utilize one or more type of computer readable media. Computer readable media can be any available media that is resident on, associable with, or can be accessed by such circuits and/or computing components. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can accessed by computing component. Communication media may comprise computer readable instructions, data structures, program modules and/or other components. Further, communication media may include wired media such as a wired network or direct-wired connection, however no media of any such type herein includes transitory media. Combinations of the any of the above are also included within the scope of computer readable media.

In the present description, the terms component, module, device, etc. may refer to any type of logical or functional software elements, circuits, blocks and/or processes that may be implemented in a variety of ways. For example, the functions of various circuits and/or blocks can be combined with one another into any other number of modules. Each module may even be implemented as a software program stored on a tangible memory (e.g., random access memory, read only memory, CD-ROM memory, hard disk drive, etc.) to be read by a central processing unit to implement the functions of the innovations herein. Or, the modules can comprise programming instructions transmitted to a general-purpose computer or to processing/graphics hardware via a transmission carrier wave. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

As disclosed herein, features consistent with the disclosure may be implemented via computer-hardware, software, and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may also be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) though again does not include transitory media. Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the applicable rules of law.

While the foregoing has been with reference to a particular embodiment of the disclosure, it will be appreciated by those skilled in the art that changes in this embodiment may be made without departing from the principles and spirit of the disclosure, the scope of which is defined by the appended claims.

What is claimed is:

1. A content system, comprising:
   a store containing a plurality of pieces of interactive content, each piece of interactive content having a plurality of hot spots distributed in the piece of interactive content, wherein each hot spot is associated with a sense interaction triggerable when a user engages with a particular hot spot in the piece of interactive content, the sense interaction being selected from one of a taste sense interaction, a smell sense interaction, an auditory sense interaction, a touch sense interaction and a visual sense interaction, wherein the particular hot spot is associated with an advertiser that pays a content provider of the piece of interactive content for each engagement of the particular hot spot by the user;
   a computer system, connected to the store, having a processor that executes a plurality of instructions so that the computer system is configured to:
      detect an engagement with the particular hot spot for a particular sense interaction in a particular piece of interactive content;
      compensate the content provider of the particular piece of interactive content for the engagement of the particular hot spot; and a sense interaction system connected to the computer system that generates the particular sense interaction based on the detected engagement of the particular hot spot, the sense interaction system having a smell sense device that emanates a signal that is synchronized to the smell sense interaction hot spot in the piece of interactive content so that the user interacts with the piece of interactive content using the sense of smell, a touch sense device that generates a signal that is synchronized to the touch sense interaction hot spot in the piece of interactive content so that the user interacts with the piece of interactive content using the sense of touch, wherein each sense device generates a tuple that automatically maps the sense interaction associated with the sense device onto a scene of the interaction content and a duration of the sense interaction.

2. The system of claim 1, wherein the computer system is further configured to detect a first level of engagement, to compensate the content provider by a first compensation rate for the first level of engagement, to detect a second level of engagement and to compensate the content provider by a second compensation rate for the second level of engagement, wherein the second compensation rate is more than the first compensation rate because the second level of engagement is a more than a limited first level of engagement.

3. The system of claim 2, wherein the computer system is further configured to detect, for the first level of engagement, a display of a sense detail page for the particular hotspot.

4. The system of claim 3, wherein the computer system is further configured to detect, for the second level of engagement, a click on the particular hotspot within a predetermined period of time.

5. The system of claim 1 further comprising one or more pieces of furniture, wherein the one or more pieces of furniture have the sense interaction system integrated into the one or more pieces of furniture so that the user experiences the engagement with the particular hotspot while adjacent the one or more pieces of furniture.

6. The system of claim 5, wherein the sense interaction system is one of embedded into the one or more pieces of furniture and removably attached to the one or more pieces of furniture.

7. The system of claim 6, wherein the one or more pieces of furniture further comprises a couch having an auditory sense device that provides the auditory sense interaction to a user adjacent the couch and the a touch sense device that provides the a touch sense interaction to the user adjacent the couch and a coffee table having the a smell sense device that provides the smell sense interaction to the user adjacent the coffee table and a sight sense device that provides the sight sense interaction to the user adjacent the coffee table.

8. The system of claim 1 further comprising a user computing device having a processor and an application executed by the processor so that the user computing device is configured to display the piece of interactive content to the user and to receive the engagement by the user of the particular sense interaction hot spot in the piece of interactive content.

9. The system of claim 1 further comprising a user computing device having a processor and an application executed by the processor so that the user computing device is configured to display the piece of interactive content to the user and to access an application programing interface of the sense interaction system to retrieve information about the particular sense interaction hotspot engaged by the user.

10. The system of claim 1, wherein the computer system is further configured to accept a bid to sponsor a new sense interaction for a particular scene in the piece of interactive content.

11. A method for content interaction, comprising:
storing a plurality of pieces of interactive content, each piece of interactive content having a plurality of hot spots distributed in the piece of interactive content wherein each hot spot is associated with a sense interaction triggerable when a user engages with the hot spot, the sense interaction being selected from one of a taste sense interaction, a smell sense interaction, an auditory sense interaction, a touch sense interaction and a visual sense interaction, wherein the hot spot is associated with an advertiser that pays a content provider of the piece of content for each engagement of the particular hot spot by the user;
detecting, by a computer system, an engagement with the particular hot spot for a particular sense interaction in a particular piece of interactive content;
compensating, by the computer system, a particular content provider of the particular piece of interactive content for the engagement of the particular hot spot;
generating, by a sense interaction system connected to the computer system, the particular sense interaction that further comprises emanating, by a smell sense device, a signal that is synchronized to the smell sense interaction hot spot in the piece of interactive content so that the user interacts with the piece of interactive content using the sense of smell and generating, by a touch sense device, a signal that is synchronized to the touch sense interaction hot spot in the piece of interactive content so that the user interacts with the piece of interactive content using the sense of touch; and
generating, by each sense device, a tuple that automatically maps the sense interaction associated with the sense device onto a scene of the interaction content and a duration of the sense interaction.

12. The method of claim 11, wherein detecting the engagement further comprises detecting a first level of engagement to compensate the particular content provider by a first compensation rate for the first level of engagement and detecting a second level of engagement to compensate the particular content provider by a second compensation rate for the second level of engagement, wherein the second compensation rate is more than the first compensation rate because the second level of engagement is a more than a limited first level of engagement.

13. The method of claim 12, wherein detecting the first level of engagement further comprises detecting a display of a sense detail page for the particular hotspot.

14. The method of claim 13, wherein detecting the second level of engagement further comprises detecting a click on the particular hotspot within a predetermined period of time.

15. The method of claim 11 further comprising accepting, by the computer system, a bid to sponsor a new sense interaction for a particular scene in the particular piece of interactive content.

* * * * *